US012694609B2

(12) United States Patent
Yoo et al.

(10) Patent No.: US 12,694,609 B2
(45) Date of Patent: Jul. 28, 2026

(54) ELECTRONIC DEVICE AND COMPUTER-READABLE STORAGE MEDIUM FOR PROVIDING VIRTUAL SPACE

(71) Applicant: Samsung Electronics Co., Ltd., Suwon-si (KR)

(72) Inventors: Jonghyuck Yoo, Suwon-si (KR); Moonjeong Kim, Suwon-si (KR); Youngrog Kim, Suwon-si (KR); Taeyeong Kim, Suwon-si (KR); Wonkyu Sung, Suwon-si (KR); Taeyang Song, Suwon-si (KR); Changhan Lee, Suwon-si (KR); Jihea Park, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 18/346,569

(22) Filed: Jul. 3, 2023

(65) Prior Publication Data

US 2024/0062459 A1      Feb. 22, 2024

Related U.S. Application Data

(63) Continuation of application No. PCT/KR2023/006518, filed on May 12, 2023.

(30) Foreign Application Priority Data

Aug. 17, 2022    (KR) ........................ 10-2022-0102564
Oct. 7, 2022    (KR) ........................ 10-2022-0129068

(51) Int. Cl.
*G06T 17/00*        (2006.01)
*G06F 3/048*        (2013.01)
(Continued)

(52) U.S. Cl.
CPC .......... *G06T 17/00* (2013.01); *G06F 3/04815* (2013.01); *G06F 3/0482* (2013.01)

(58) Field of Classification Search
CPC ..... G06T 17/00; G06T 17/05; G06F 3/04815; G06F 3/0482; G06F 3/011; G06F 3/041;
(Continued)

(56) References Cited

U.S. PATENT DOCUMENTS 9,253,183 B2 *   2/2016  Nathan ................... H04L 63/08
10,657,701 B2 *   5/2020  Osman ................... A63F 13/25
(Continued)

FOREIGN PATENT DOCUMENTS

KR    10-2002-0073313        9/2002
KR    10-2004-0099049        11/2004
(Continued)

OTHER PUBLICATIONS

Search Report and Written Opinion dated Aug. 8, 2023 issued in International Patent Application No. PCT/KR2023/006518.
(Continued)

*Primary Examiner* — Vijay Shankar
(74) *Attorney, Agent, or Firm* — Nixon & Vanderhye, P.C.

(57)        ABSTRACT

According to an embodiment, an electronic device includes: a display, a communication circuit, a memory configured to store instructions, and a processor, wherein the at least one processor is configured to, when the instructions are executed: identify a first input representing selecting at least one object corresponding to at least one user among a plurality of objects corresponding to a plurality of users, identify a second input for executing a second application, change the first user interface to a second interface including the virtual space based on the first input and the second input, and control the communication circuit to transmit, to (Continued)

at least one external electronic device of the least one user, a signal configured to cause the at least one external electronic device to display a notification for guiding entry into the virtual space.

20 Claims, 19 Drawing Sheets

(51) Int. Cl.
G06F 3/04815 (2022.01)
G06F 3/0482 (2013.01)

(58) Field of Classification Search
CPC ............ G06F 3/04817; G06F 3/04842; G06F 3/04845; G06F 3/04883; G06F 3/016; G06F 3/017; G01S 5/02; H04L 51/18; H04M 1/72403; H04N 7/157
See application file for complete search history.

(56) References Cited

U.S. PATENT DOCUMENTS

| | | | |
|---|---|---|---|
| 10,904,481 B1 | 1/2021 | Morris et al. | |
| 11,463,486 B2 | 10/2022 | Kim et al. | |
| 11,481,965 B2 | 10/2022 | Ahn et al. | |
| 12,086,393 B2 * | 9/2024 | Kim .................... | G06F 3/04817 |
| 2013/0260893 A1 | 10/2013 | Shin et al. | |

| | | | |
|---|---|---|---|
| 2015/0143487 A1 * | 5/2015 | Nathan ................... | H04L 63/08 |
| | | | 726/6 |
| 2018/0005429 A1 * | 1/2018 | Osman .................... | A63F 13/56 |
| 2021/0352244 A1 | 11/2021 | Benedetto et al. | |
| 2022/0070232 A1 | 3/2022 | Young | |
| 2023/0015940 A1 | 1/2023 | Zhang et al. | |
| 2023/0072463 A1 * | 3/2023 | Liu ........................ | A63F 13/795 |
| 2023/0101036 A1 | 3/2023 | Yoo et al. | |
| 2023/0385011 A1 * | 11/2023 | Shimizu ................. | H04N 7/157 |

FOREIGN PATENT DOCUMENTS

| | | |
|---|---|---|
| KR | 10-2013-0111147 | 10/2013 |
| KR | 10-2019-0071241 | 6/2019 |
| KR | 10-2020-0004956 | 1/2020 |
| KR | 20200023858 A | 3/2020 |
| KR | 10-2021-0127054 | 10/2021 |
| KR | 20210127054 A | 10/2021 |
| KR | 10-2382521 | 3/2022 |
| KR | 102368616 B1 | 3/2022 |
| KR | 102388442 B1 | 4/2022 |
| KR | 10-2023-0137683 | 10/2023 |

OTHER PUBLICATIONS

Extended Search Report dated Sep. 26, 2025 in European Patent Application No. 23854973.7.
Office Action dated Jun. 10, 2026 in Indian Patent Application No. 202517013464 and English-language translation.

* cited by examiner

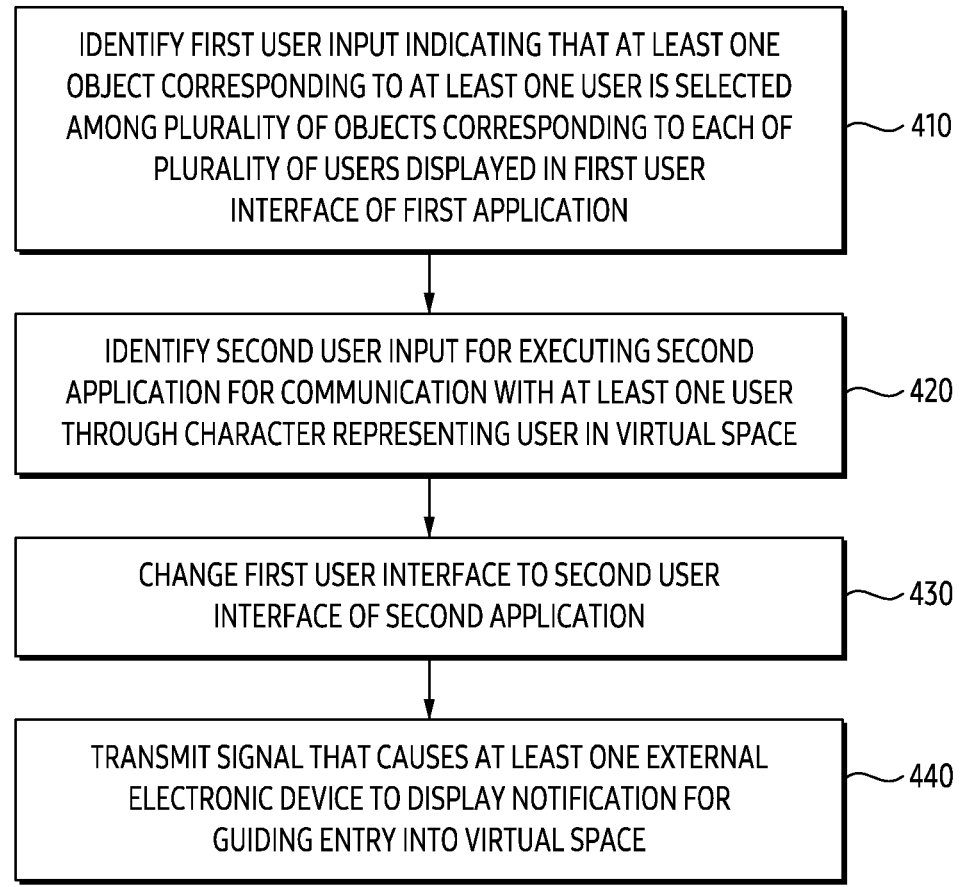

IDENTIFY FIRST USER INPUT INDICATING THAT AT LEAST ONE OBJECT CORRESPONDING TO AT LEAST ONE USER IS SELECTED AMONG PLURALITY OF OBJECTS CORRESPONDING TO EACH OF PLURALITY OF USERS DISPLAYED IN FIRST USER INTERFACE OF FIRST APPLICATION ⌐ 410

IDENTIFY SECOND USER INPUT FOR EXECUTING SECOND APPLICATION FOR COMMUNICATION WITH AT LEAST ONE USER THROUGH CHARACTER REPRESENTING USER IN VIRTUAL SPACE ⌐ 420

CHANGE FIRST USER INTERFACE TO SECOND USER INTERFACE OF SECOND APPLICATION ⌐ 430

TRANSMIT SIGNAL THAT CAUSES AT LEAST ONE EXTERNAL ELECTRONIC DEVICE TO DISPLAY NOTIFICATION FOR GUIDING ENTRY INTO VIRTUAL SPACE ⌐ 440

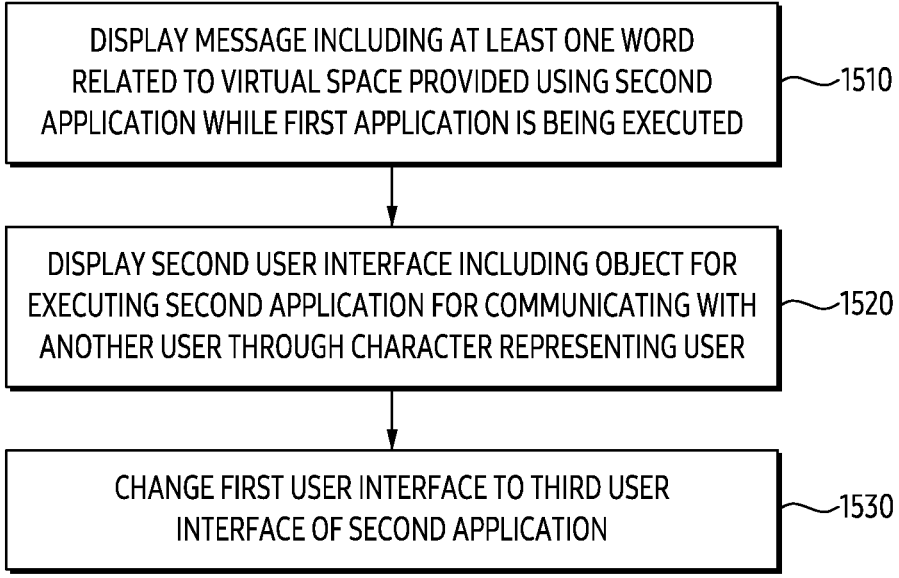

DISPLAY MESSAGE INCLUDING AT LEAST ONE WORD RELATED TO VIRTUAL SPACE PROVIDED USING SECOND APPLICATION WHILE FIRST APPLICATION IS BEING EXECUTED ～1510

DISPLAY SECOND USER INTERFACE INCLUDING OBJECT FOR EXECUTING SECOND APPLICATION FOR COMMUNICATING WITH ANOTHER USER THROUGH CHARACTER REPRESENTING USER ～1520

CHANGE FIRST USER INTERFACE TO THIRD USER INTERFACE OF SECOND APPLICATION ～1530

FIG. 15

DISPLAY FIRST USER INTERFACE INCLUDING INFORMATION ON AT LEAST ONE CONTACT ～1710

DISPLAY SECOND USER INTERFACE INCLUDING AT LEAST ONE AVATAR RELATED TO AT LEAST ONE CONTACT ～1720

DISPLAY VIRTUAL SPACE INCLUDING AVATAR RELATED TO USER OF ELECTRONIC DEVICE ～1730

ELECTRONIC DEVICE AND COMPUTER-READABLE STORAGE MEDIUM FOR PROVIDING VIRTUAL SPACE

CROSS-REFERENCE TO RELATED APPLICATIONS

This application is a continuation of International Application No. PCT/KR2023/006518 designating the United States, filed on May 12, 2023, in the Korean Intellectual Property Receiving Office and claiming priority to Korean Patent Application Nos. 10-2022-0102564, filed on Aug. 17, 2022, and 10-2022-0129068, filed on Oct. 7, 2022, in the Korean Intellectual Property Office, the disclosures of all of which are incorporated by reference herein in their entireties.

BACKGROUND

Field

The disclosure relates to an electronic device and a computer-readable storage medium for providing a virtual space.

Description of Related Art

With the development of technology, a virtual space are being used using computers or Internet. In addition, various software for providing the virtual space is being developed. By entering the virtual space, a user of the electronic device may communicate with another user in real time without limitations of time or space. The user may perform various activities in the virtual space using an avatar corresponding to the user.

SUMMARY

According to an example embodiment, an electronic device may comprise: a display, a communication circuit, a memory configured to store executable instructions, and at least one processor configured to execute the instructions by accessing the memory, the processor being further configured to: identify a first input representing selecting at least one object corresponding to at least one user among a plurality of objects corresponding to a plurality of users distinct from a user of the electronic device displayed in a first user interface of a first application while a first application for communication with another user is being executed, identify a second input for executing a second application for communicating the at least one user through a character representing the user in a virtual space based on the first input being identified, change the first user interface to a second interface of a second application including the virtual space including the character and at least one character representing the at least one user based on the first input and the second input, and control the communication circuit to transmit, to at least one external electronic device of the least one user, a signal configured to cause the at least one external electronic device to display a notification for guiding entry into the virtual space based on the first input and the second input.

According to an example embodiment, a non-transitory computer readable storage medium storing one or more programs, the one or more programs may include instructions which, when executed by at least one processor of an electronic device with a display, a communication circuit, and a memory, cause the electronic device to perform operations including: identifying a first input representing selecting at least one object corresponding to at least one user among a plurality of objects corresponding to a plurality of users distinct from a user of the electronic device displayed in a first user interface of a first application while a first application for communication with another user is being executed, identify a second input for executing a second application for communicating the at least one user through a character representing the user in a virtual space based on the first input being identified, change the first user interface to a second interface of the second application including the virtual space including the character and at least one character representing the at least one user based on the first input and the second input, and control the communication circuit to transmit to at least one external electronic device of the least one user, a signal configured to cause the at least one external electronic device to display a notification for guiding entry into the virtual space based on the first input and the second input.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a flowchart illustrating an example operation of an electronic device according to various embodiments;

FIG. 13 is a diagram illustrating an example operation of an electronic device according to various embodiments;

FIG. 15 is a flowchart illustrating an example operation of an electronic device according to various embodiments;

DETAILED DESCRIPTION

Figure 1:
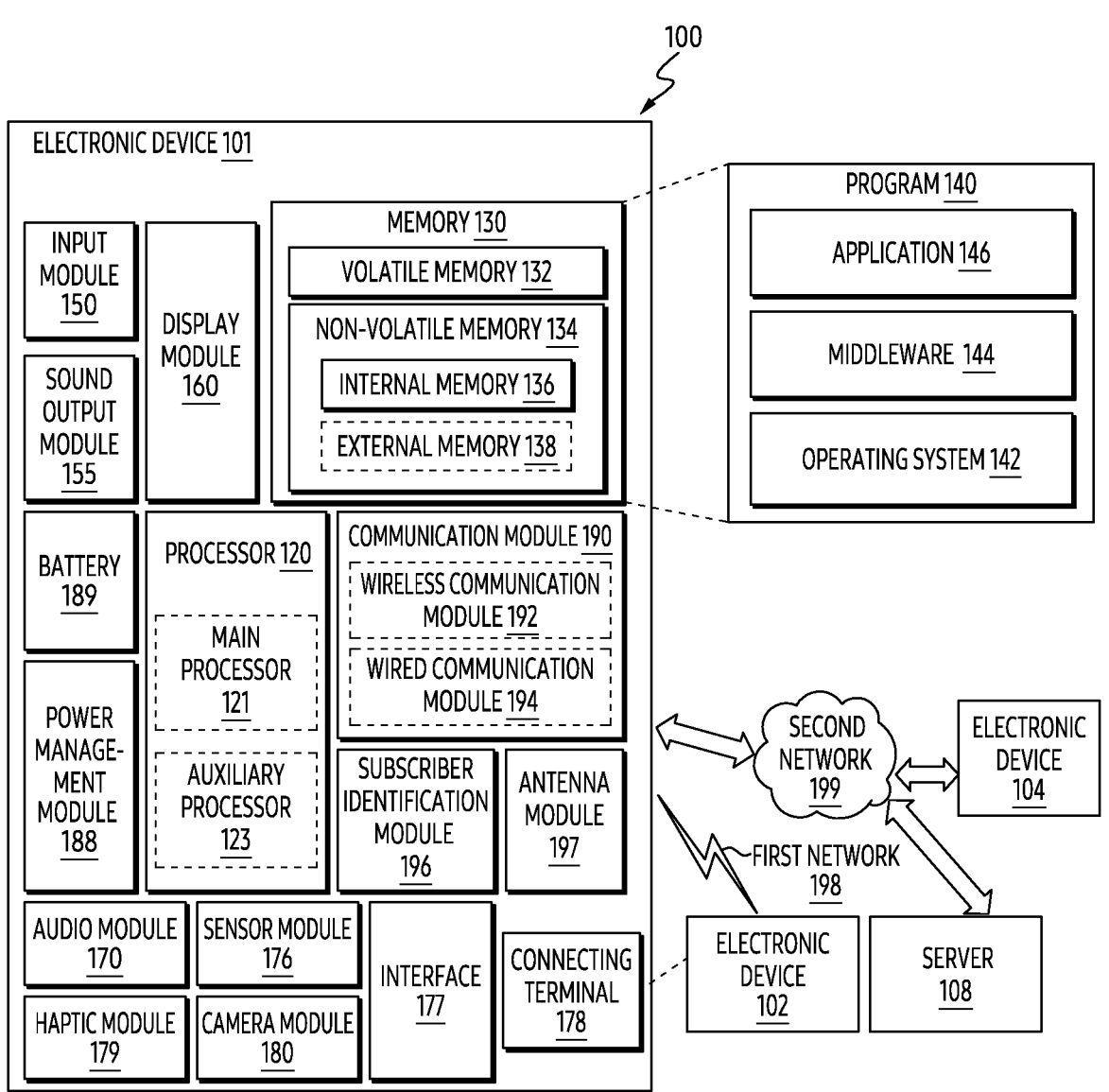
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state.

According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, an electronic device (e.g., the electronic device 101 of FIG. 1) may be provided a service related to a virtual space to a user using an application. The user may enter a virtual space provided in the application in association with other applications without directly executing the application through the service. Hereinafter, various embodiments for providing a service for entering a virtual space through other application and/or home screen may be described.

Figure 2:
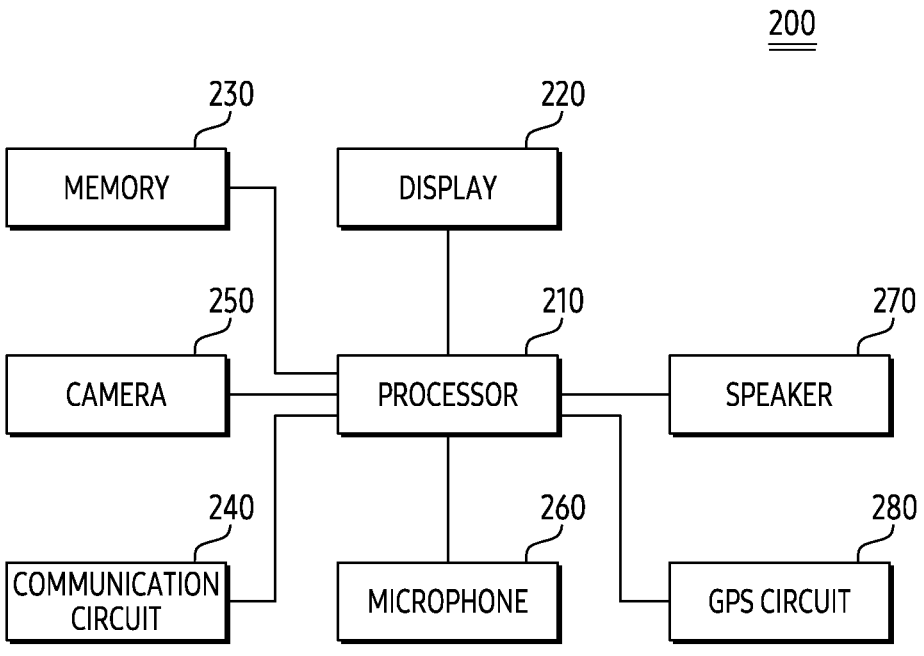
FIG. 2 is a block diagram illustrating an example configuration of an electronic device according to various embodiments.

FIG. 2 is a block diagram illustrating an example configuration of an electronic device according to various embodiments.

Referring to FIG. 2, the electronic device 200 may include some or all of the components of the electronic device 101 illustrated in FIG. 1. For example, the electronic device 200 may correspond to the electronic device 101 of FIG. 1.

According to an embodiment, the electronic device 200 may include a processor (e.g., including processing circuitry) 210, a display 220, a memory 230, a communication circuit 240, a camera 250, a microphone 260, a speaker 270, and/or a global positioning system (GPS) circuit 280. According to an embodiment, the electronic device 200 may include at least one of the processor 210, the display 220, the memory 230, the communication circuit 240, the camera 250, the microphone 260, the speaker 270, and the GPS circuit 280. For example, at least a part of the processor 210, the display 220, the memory 230, the communication circuit 240, the camera 250, the microphone 260, the speaker 270, and the GPS circuit 280 may be omitted according to an embodiment.

According to an embodiment, the electronic device 200 may include the processor 210 including various processing circuitry. The processor 210 may be operably coupled with or connected to the display 220, the memory 230, the communication circuit 240, the camera 250, the microphone 260, the speaker 270, and the GPS circuit 280. The fact that the processor 210 is operably coupled with or connected to the display 220, the memory 230, the communication circuit 240, the camera 250, the microphone 260, the speaker 270, and the GPS circuit 280 may indicate that the processor 210 controls the display 220, the memory 230, the communication circuit 240, the camera 250, the microphone 260, the speaker 270, and the GPS circuit 280.

For example, the processor 210 may control the display 220, the memory 230, the communication circuit 240, the camera 250, the microphone 260, the speaker 270, and the GPS circuit 280. The display 220, the memory 230, the communication circuit 240, the camera 250, the microphone 260, the speaker 270, and the GPS circuit 280 may be controlled by the processor 210. For example, the processor 210 may be configured with at least one processor. For example, the processor 210 may include at least one processor. For example, the processor 210 may correspond to the processor 120 of FIG. 1.

According to an embodiment, the processor 210 may include a hardware component for processing data based on one or more instructions. For example, the hardware component for processing data may include an Arithmetic and Logic Unit (ALU), a Field Programmable Gate Array (FPGA), and/or a Central Processing Unit (CPU).

According to an embodiment, the electronic device 200 may include a display 220. For example, the display 220 may include a touch panel (or a touch screen) and a touch integrated circuit (IC). For example, the display 220 may be used to display various screens. The display 220 may be used to display a user interface of an application (e.g., an application to provide services for a virtual space, an application to provide phone functions, or an application to exchange messages). For example, the display 220 may correspond to the display module 160 of FIG. 1.

According to an embodiment, the electronic device 200 may include a memory 230. For example, the memory 230 may be used to store one or more programs. The one or more programs may include instructions which cause the electronic device 200 to perform a predefined operation when executed by the processor 210 of the electronic device 200. For example, the memory 230 may correspond to the memory 130 of FIG. 1. For example, the memory 230 may be a volatile memory unit or units. For example, the memory 230 may be a nonvolatile memory unit or units. For example, memory 230 may be another type of computer-readable medium, such as a magnetic or optical disk. For example, the memory 230 may store data obtained based on an operation (e.g., an algorithm execution operation) performed by the processor 410.

According to an embodiment, the electronic device 200 may include a communication circuit 240. For example, the communication circuit 240 may correspond to at least a part of the communication module 190 of FIG. 1. For example, the communication circuit 240 may be used for various radio access technologies (RATs). For example, the communication circuit 240 may be used to perform cellular communication. For example, the communication circuit 240 may be used to perform Bluetooth communication, wireless local area network (WLAN) communication, or UWB (ultrawideband) communication.

According to an embodiment, the electronic device 200 may include a camera 250. For example, the camera 250 may be used to obtain an image of a part of the user's body (e.g., face or hand) of the electronic device 200. The camera 250 may be disposed toward the user to obtain an image of a part of the user's body. According to an embodiment, a plurality of cameras may be included to obtain an image of a part of the user's body. According to an embodiment, the electronic device 200 may further include another camera for obtaining an image of an external environment. According to an embodiment, the camera 250 may include a component for obtaining depth information. However, it is not limited thereto.

According to an embodiment, the electronic device 200 may include a microphone 260 (e.g., the input module 150 of FIG. 1). The microphone 260 may identify an electrical signal corresponding to vibration of the atmosphere. For example, the processor 210 may identify a sound (e.g., a user's voice) generated from a user using the microphone 260. The processor 210 may transmit information on the sound generated from a user to an external electronic device.

According to an embodiment, the electronic device 200 may include a speaker 270. For example, the speaker 270 may be used to output (or provide) sound configured through the processor 210. The processor 210 may receive information on a sound generated from another user from an external electronic device and output a sound through the speaker 270 based on the received information. For example, the speaker 270 may correspond to the sound output module 155 of FIG. 1.

According to an embodiment, the electronic device 200 may include a GPS circuit 280. For example, the GPS circuit 280 may correspond to a global navigation satellite system (GNSS) communication module, which is an example of the wireless communication module 192 of FIG. 1. The GPS circuit 280 may be used to receive a GPS signal. The GPS may include at least one of a global navigation satellite system (GLONASS), Beidou Navigation Satellite System (hereinafter, "beidou"), quasi-zenith satellite system (QZSS), Indian regional satellite system (IRNSS) or Galileo (the European global satellite-based navigation system), according to an area of use or a bandwidth. The electronic device 200 may obtain location information of the electronic device 200 using the GPS circuit 280.

Figure 3:
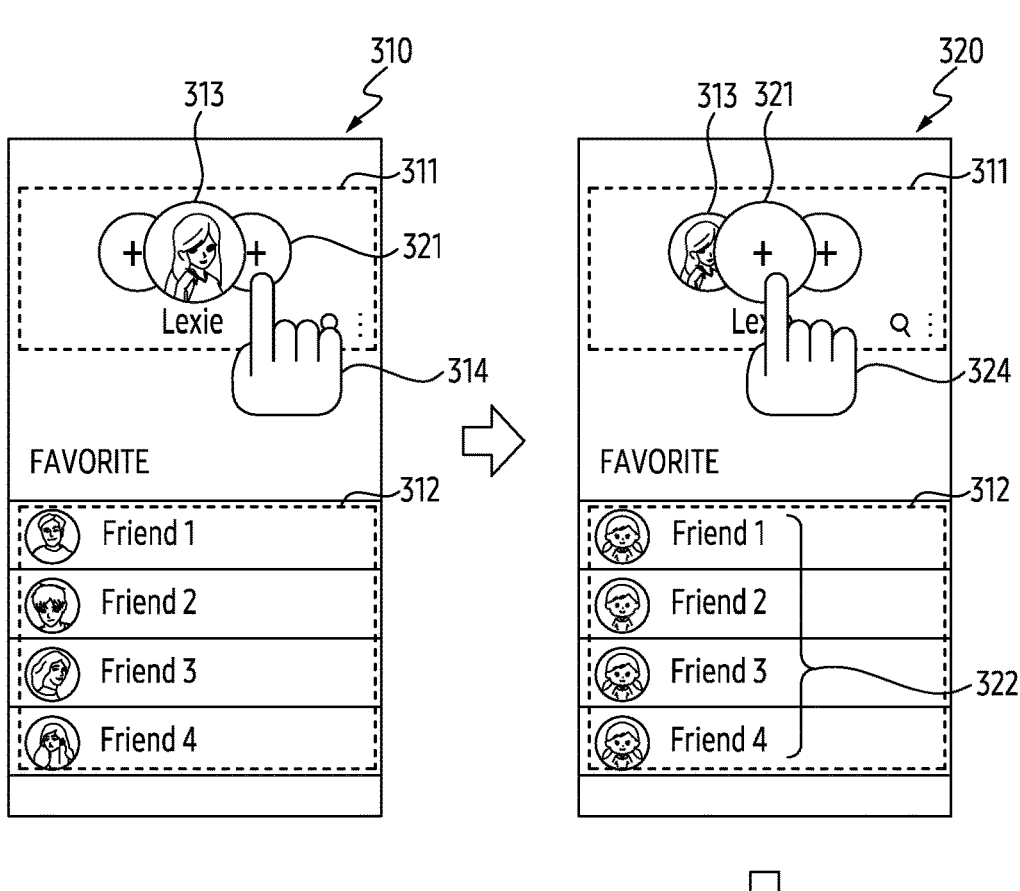
FIG. 3 is a diagram illustrating an example operation of an electronic device according to various embodiments.

FIG. 3 is a diagram illustrating an example operation of an electronic device according to various embodiments.

Referring to FIG. 3, screens 310, 320 and 330 are examples of screens displayed through the display 220 of the electronic device 200.

The processor 210 may display a first user interface of the first application on the screen 310. For example, the first application may be used for communication with other users. For example, the first application may include a contact application.

According to an embodiment, the processor 210 may display information on a user of the electronic device 200 in an area 311 in the first user interface. For example, the processor 210 may display a content 313 for indicating a user of the electronic device 200 in the area 311. The processor 210 may display the content 313 by overlapping an element 321 for displaying a plurality of objects 322.

According to an embodiment, the processor 210 may display a plurality of contacts in the area 312 in the first user interface. The plurality of contacts may include a name, a contact, and/or a picture.

According to an embodiment, the processor 210 may identify a user input 314 for the element 321 included in the area 311. For example, the processor 210 may identify a user input 314 for the element 321 for displaying the plurality of objects 322 while a plurality of contacts are displayed in the first user interface based on the execution of the first application. The processor 210 may change a screen of the electronic device 200 from the screen 310 to the screen 320 in response to the user input 314.

According to an embodiment, the processor 210 may display the plurality of objects 322 corresponding to a plurality of users in the first user interface on the screen 320 in response to the user input 314 for the element 321. For example, the plurality of users may be distinguished from users of a plurality of contacts displayed on screen 310. For example, a plurality of users respectively corresponding to the plurality of objects 322 may be users who have set characters in a virtual space among users of the plurality of contacts. According to an embodiment, the plurality of users may correspond to users of a plurality of contacts displayed on the screen 310.

For example, the processor 210 may display the element 321 by overlapping the content 313 in the area 311. The processor 210 may display a plurality of objects 322 respectively corresponding to a plurality of users in the area 312. The plurality of objects 322 may include a plurality of thumbnails and a plurality of names of a plurality of characters.

According to an embodiment, the user of the electronic device 200 may be a state in which a character to be used in a virtual space is not set. When the user of the electronic device 200 does not set a character to be used in the virtual space, the element 321 may be set as a predefined object (e.g., a plus shape). The processor 210 may identify a user input 324 to the element 321 to set a character to be used in the virtual space. The processor 210 may change a screen of the electronic device 200 from the screen 320 to the screen 330 in response to the user input 324.

According to an embodiment, the processor 210 may display a window 333 for determining a character corresponding to the user of the electronic device 200 on the screen 330 in response to the user input 324 for the element 321. For example, the processor 210 may display selectable characters in the window 333. According to an embodiment, the processor 210 may display an interface for changing (or determining) a detailed shape of a character corresponding to a user.

FIG. 4 is a flowchart illustrating an example operation of an electronic device according to various embodiments.

Referring to FIG. 4, in operation 410, the processor 210 may identify a first user input indicating selecting at least one object corresponding to at least one user, among a plurality of objects respectively corresponding to a plurality of users displayed in the first user interface of the first application. For example, the processor 210 may identify a first user input indicating selecting at least one object corresponding to at least one user, among a plurality of objects respectively corresponding to a plurality of users distinguished from the user of electronic device 200, displayed in the first user interface of the first application, while the first application for communication with other users is executed.

According to an embodiment, the processor 210 may execute a first application for communication with another user. For example, the first application may include a contact application, a phone application, and a messenger application. The processor 210 may display a first user interface of the first application based on execution of the first application. For example, the first user interface may include a plurality of objects. The plurality of objects may respectively correspond to a plurality of users.

According to an embodiment, the processor 210 may identify a first user input indicating selecting at least one object corresponding to at least one user among a plurality of objects respectively corresponding to a plurality of users. For example, a user of the electronic device 200 may perform a first user input to select at least one user to perform communication within a virtual space.

In operation 420, the processor 210 may identify a second user input for executing a second application for communicating with at least one user through a character representing the user in a virtual space. For example, after the first user input is identified, the processor 210 may identify a second user input for executing the second application for communicating with at least one user through a character representing the user in a virtual space.

According to an embodiment, after the first user input is identified, the processor 210 may identify a second user input for executing the second application. For example, the second application may be used to communicate with at least one user through a character representing the user in a virtual space. For example, the processor 210 may identify a second user input for an object for entering a virtual space provided through the second application. The processor 210 may identify at least one user for communicating through a virtual space based on the first user input, and execute a second application for communicating with at least one identified user in the virtual space based on the second user input.

In operation 430, the processor 210 may change the first user interface to a second user interface of the second application. For example, based on the first user input and the second user input, the processor 210 may change the first user interface to the second user interface of the second application including a virtual space including a character representing a user and at least one character representing at least one user.

According to an embodiment, the processor 210 may change the first user interface to the second user interface of the second application by executing the second application based on the first user input and the second user input.

In operation 440, the processor 210 may transmit a signal causing at least one external electronic device to display a notification for guiding entry into the virtual space. For example, based on the first user input and the second user input, the processor 210 may transmit a signal causing the at least one external electronic device to display a notification for guiding entry into the virtual space to the at least one external electronic device of the at least one user.

According to an embodiment, the processor 210 may transmit a signal causing at least one external electronic device to display a notification for guiding at least one user to enter the virtual space. The at least one external electronic device may receive a signal from the electronic device 200. Each of the at least one external electronic device may display a notification for guiding at least one user to enter the virtual space based on the received signal.

Figure 5:
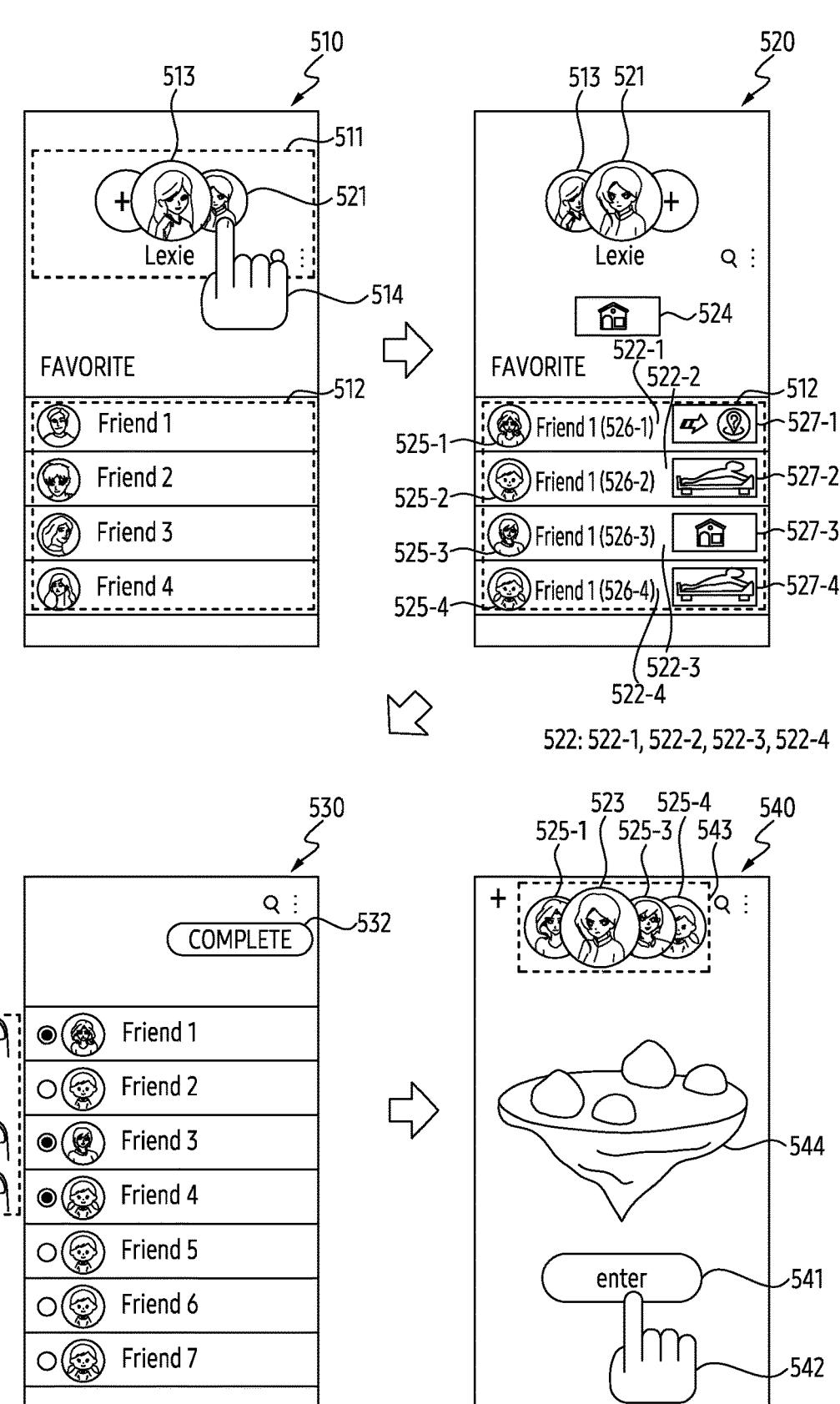
FIG. 5 is a diagram illustrating an example operation of an electronic device according to various embodiments.

FIG. 5 is a diagram illustrating an example operation of an electronic device according to various embodiments.

Referring to FIG. 5, screens 510, 520, 530 and 540 are examples of screens displayed through the display 220 of the electronic device 200.

According to an embodiment, the processor 210 may display a first user interface of the first application on the screen 510. For example, the first application may be used for communication with other users. For example, the first application may include a contact application. The screen 510 may correspond to the screen 310 of FIG. 3.

For example, the processor 210 may display information on a user of the electronic device 200 in an area 511 in the first user interface. For example, the processor 210 may display content 513 for indicating a user of the electronic device 200 in the area 511. The processor 210 may display the content 513 by overlapping an element 521 for displaying a plurality of objects 522. For example, the processor 210 may display a plurality of contacts in the area 312 within the first user interface.

According to an embodiment, the processor 210 may identify a user input 514 for an element 521 for displaying a plurality of objects 522. The processor 210 may change a screen of the electronic device 200 from the screen 510 to the screen 520 in response to the user input 514.

The processor 210 may display a plurality of objects 522 respectively corresponding to a plurality of users within the first user interface on the screen 520 in response to a user input to the element 521.

According to an embodiment, a plurality of users may be distinguished from users of a plurality of contacts displayed on the screen 510. For example, the plurality of users respectively corresponding to the plurality of objects 522 may be users who have set characters in the virtual space among the users of the plurality of contacts.

According to an embodiment, the processor 210 may display the element 521 in the area 511 by overlapping the content 513. The processor 210 may display the plurality of objects 522 respectively corresponding to the plurality of users in the area 512. For example, the plurality of objects 522 may include an object 522-1, an object 522-2, an object 522-3 and/or an object 522-4. Each of the object 522-1, the object 522-2, the object 522-3 and the object 522-4 may correspond to one user.

The plurality of objects 522 may include a plurality of thumbnails (e.g., thumbnails 525-1 to 525-4) of a plurality of characters, a plurality of names (e.g., names 526-1 to 526-4), and/or a plurality of labels (e.g., labels 527-1 to 527-4) for indicating a state of the plurality of users in association with the plurality of thumbnails.

For example, the object 522-1 may include a thumbnail of character 525-1 for a user corresponding to the object 522-1, a name 526-1 for a user corresponding to the object 522-1, and a label 527-1 for indicating a state of the user corresponding to the object 522-1. The object 522-2 may include a thumbnail of character 525-2 for a user corresponding to the object 522-2, a name 526-2 for a user corresponding to the object 522-2, and a label 527-2 for indicating a state of the user corresponding to the object 522-2. The object 522-3 may include a thumbnail of character 525-3 for a user corresponding to the object 522-3, a name 526-3 for a user corresponding to the object 522-3, and a label 527-3 for indicating a state of the user corresponding to the object 522-3. The object 522-4 may include a thumbnail of character 525-4 for a user corresponding to the object 522-4, a name 526-4 for a user corresponding to the object 522-3, and a label 527-4 for indicating a state of the user corresponding to the object 522-4.

According to an embodiment, each of the plurality of labels (e.g., labels 527-1 to 527-4) may be configured as a visual object for indicating a state of a user. For example, the label 527-1 may be set based on a location of a user corresponding to the object 522-1.

According to an embodiment, the label 524 may be configured as a visual object for indicating a state of a user of the electronic device 200. The processor 210 may identify the location of the user of the electronic device 200 using the GPS circuit 280. The processor 210 may configure the label 524 based on the location of the user of the electronic device 200. For example, the processor 210 may configure label 524 as a visual object representing a house based on identifying that the user of the electronic device 200 is at home.

According to an embodiment, the processor 210 may identify a user input 531 indicating that at least one object is selected from a plurality of objects displayed on the screen 530. According to an embodiment, the processor 210 may identify a user input 531 indicating a selection of at least one object among a plurality of objects displayed on the screen 530. For example, in response to an input (e.g., long press input) indicating a selection of the object 522-1 among user inputs 531, the processor 210 may change a screen of the electronic device 200 from the screen 520 to the screen 530.

For example, the processor 210 may identify a user input 531 indicating selecting at least one object corresponding to at least one user among the plurality of objects 522 respectively corresponding to the plurality of users. For example, the user input 531 may be an example of the first user input of FIG. 4.

For example, the user input 531 may indicate selecting the object 522-1, object 522-3, and object 522-4. The processor 210 may change a shape of a check box indicating that the object 522-1, the object 522-3 and the object 522-4 are selected in response to the user input 531.

The processor 210 may identify an input to the object 532, after receiving the user input 531. The input to the object 532 may indicate that the selection of at least one object from among a plurality of objects 522 is completed. The processor 210 may change a screen of the electronic device 200 from the screen 530 to the screen 540 based on the input to the object 532.

According to an embodiment, the processor 210 may display a plurality of thumbnails 543 including thumbnails (e.g., thumbnail 525-1, thumbnail 525-3 and thumbnail 525-4) of at least one user identified based on the user input 531 and thumbnails related to a user of the electronic device 200 on the screen 540. The processor 210 may display an object 544 indicating a virtual space to be entered on the screen 540. According to an embodiment, the processor 210 may provide a screen to select a virtual space after identifying the user input 531. The processor 210 may display the object 544 indicating the selected virtual space on the screen 540 based on an input indicating the selection for the virtual space.

According to an embodiment, the processor 210 may identify a user input 542 for executing a second application for communicating with at least one user through a character representing the user in a virtual space. For example, the processor 210 may identify an input to the object 541 as a user input 542. For example, the user input 542 may be an example of the second user input of FIG. 4.

Figure 6:
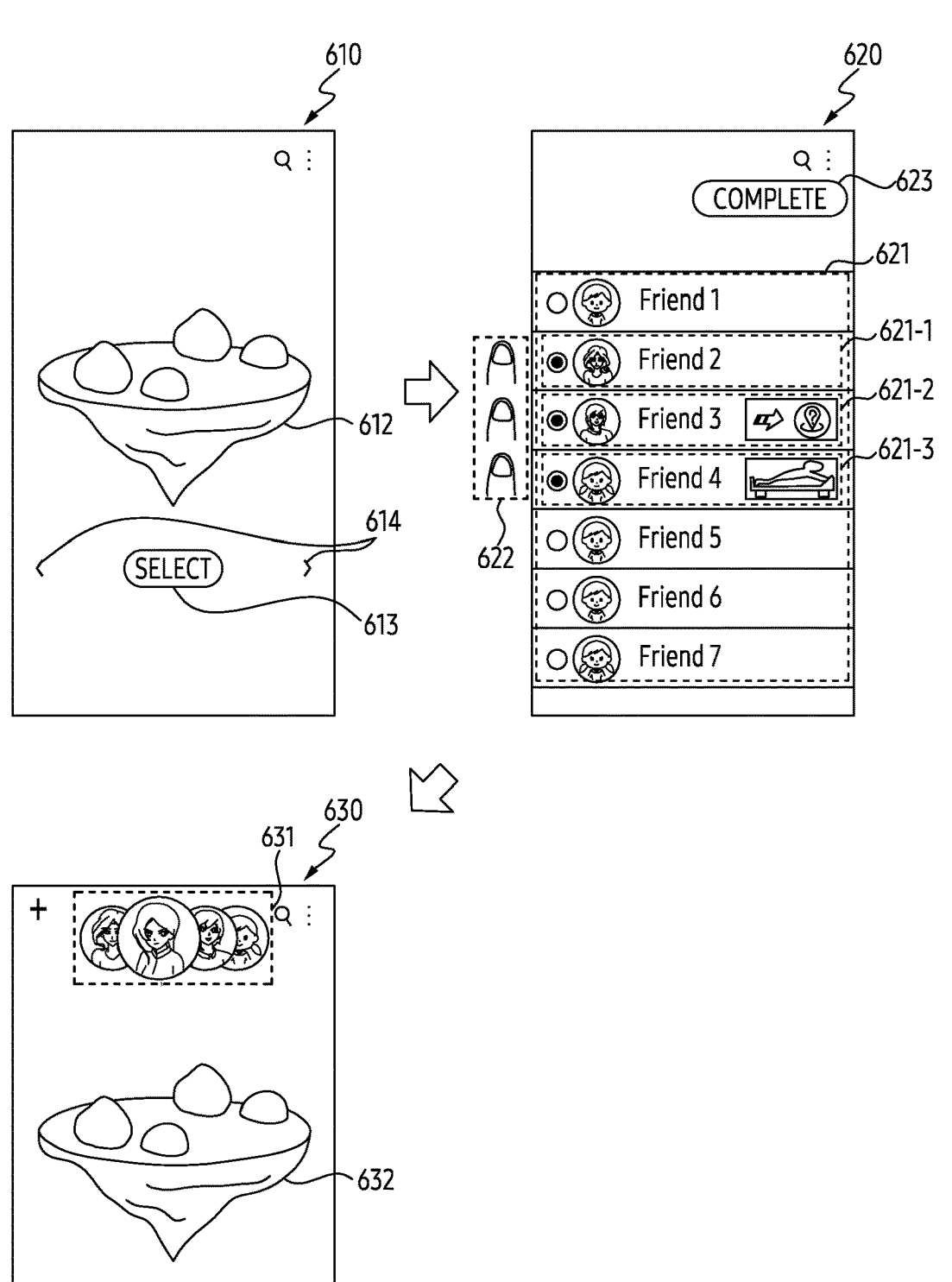
FIG. 6 is a diagram illustrating an example screen of an electronic device representing virtual spaces, according to various embodiments.

FIG. 6 is a diagram illustrating an example of a screen of an electronic device representing virtual spaces, according to various embodiments.

Figure 7:
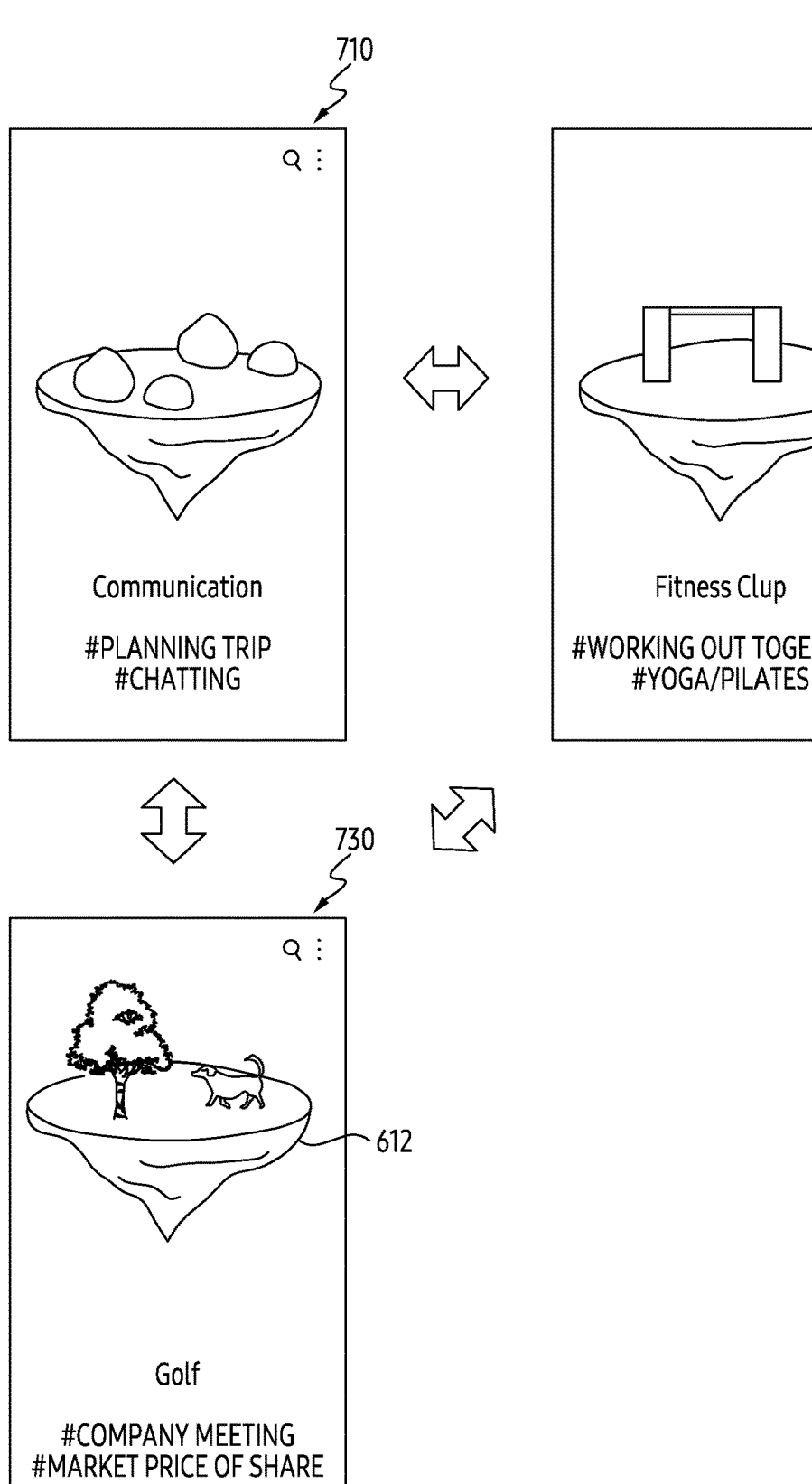
FIG. 7 is a diagram illustrating an example operation of an electronic device according to various embodiments.

FIG. 7 is a diagram illustrating an example operation of an electronic device according to various embodiments.

Referring to FIG. 6, screens 610, 620 and 630 are examples of screens displayed through the display 220 of the electronic device 200. In the embodiment according to FIG. 6, the processor 210 may select at least one user for inviting to the selected virtual space after selecting the virtual space, different from the embodiment of FIG. 5 in which at least one user is selected and then enters the virtual space.

According to an embodiment, the processor 210 may display a screen 610. The screen 610 may include an object 612 representing a virtual space, an object 613 for selecting a virtual space, and objects 614 for changing the virtual space. According to an embodiment, the processor 210 may change a virtual space in response to an input for one of the objects 614 for changing the virtual space. According to an embodiment, the processor 210 may change the object 612 representing the virtual space into another object representing another virtual space in response to an input for one of the objects 614 illustrated in FIG. 6.

Referring to FIG. 7, screens 710, 720 and 730 may indicate virtual spaces provided in a second application. According to an embodiment, the processor 210 may display the screen 710 based on an input to the object 612.

According to an embodiment, virtual spaces provided in the second application may be configured differently according to a conversation purpose and/or a conversation topic. For example, each screen 710 to screen 730 may include a title and at least one tag of each virtual space. The title may refer, for example, to a conversation purpose of the virtual space. The tag may refer, for example, to a conversation topic.

According to an embodiment, the processor 210 may display one of the screens 710 to 730 in response to at least one user input. The processor 210 may change the screen 710 to the screen 720 in response to the swipe input. The processor 210 may change the screen 720 to the screen 730 in response to the swipe input. The processor 210 may change the screen 730 to the screen 710 in response to the swipe input.

According to an embodiment, the processor 210 may identify a virtual space to which the user of the electronic device 200 enters, based on a user input indicating a selection of one of a plurality of virtual spaces. For example, the processor 210 may set (or identify) a virtual space to be entered by the user of the electronic device 200 based on a user input to one of the virtual spaces displayed on the screen 710 to 730.

According to an embodiment, the processor 210 may provide virtual spaces displayed on the screen 710 to 730 in response to an input to the object 532 displayed on the screen 530 of FIG. 5. The processor 210 may change a screen of the electronic device 200 to the screen 540 of FIG. 5 based on an input for one of the virtual spaces shown on the screen 710 to 730.

Referring back to FIG. 6, the processor 210 may change a screen of the electronic device 200 from the screen 610 to the screen 620 based on an input to the object 613 for selecting the virtual space.

According to an embodiment, the processor 210 may display a plurality of objects 621 on the screen 620. The screen 620 may correspond to the screen 530 of FIG. 5. For example, the processor 210 may identify a user input 622 indicating that at least one object corresponding to at least one user is selected from a plurality of objects 621. The processor 210 may identify a user input 622 indicating a selection of the object 621-1, the object 621-2, and the object 621-3. The processor 210 may identify the user input 622 and then identify an input to the object 623. In response to an input to the object 623, the processor 210 may change a screen of the electronic device 200 from the screen 620 to the screen 630.

According to an embodiment, the processor 210 may display at least one thumbnail 631 regarding at least one user identified based on the user input 622 and the user of the electronic device 200 on the screen 630. The processor 210 may display an object 632 indicating a virtual space to be entered on the screen 630. The processor 210 may display an object 633 for executing a second application for communicating with at least one user through a character representing the user in a virtual space. For example, the screen 630 may correspond to the screen 540 of FIG. 5.

According to an embodiment, based on a user input to the object 633, the processor 210 may provide (or display) a virtual space for communication with at least one user through a character representing the user by executing the second application.

Figure 8:
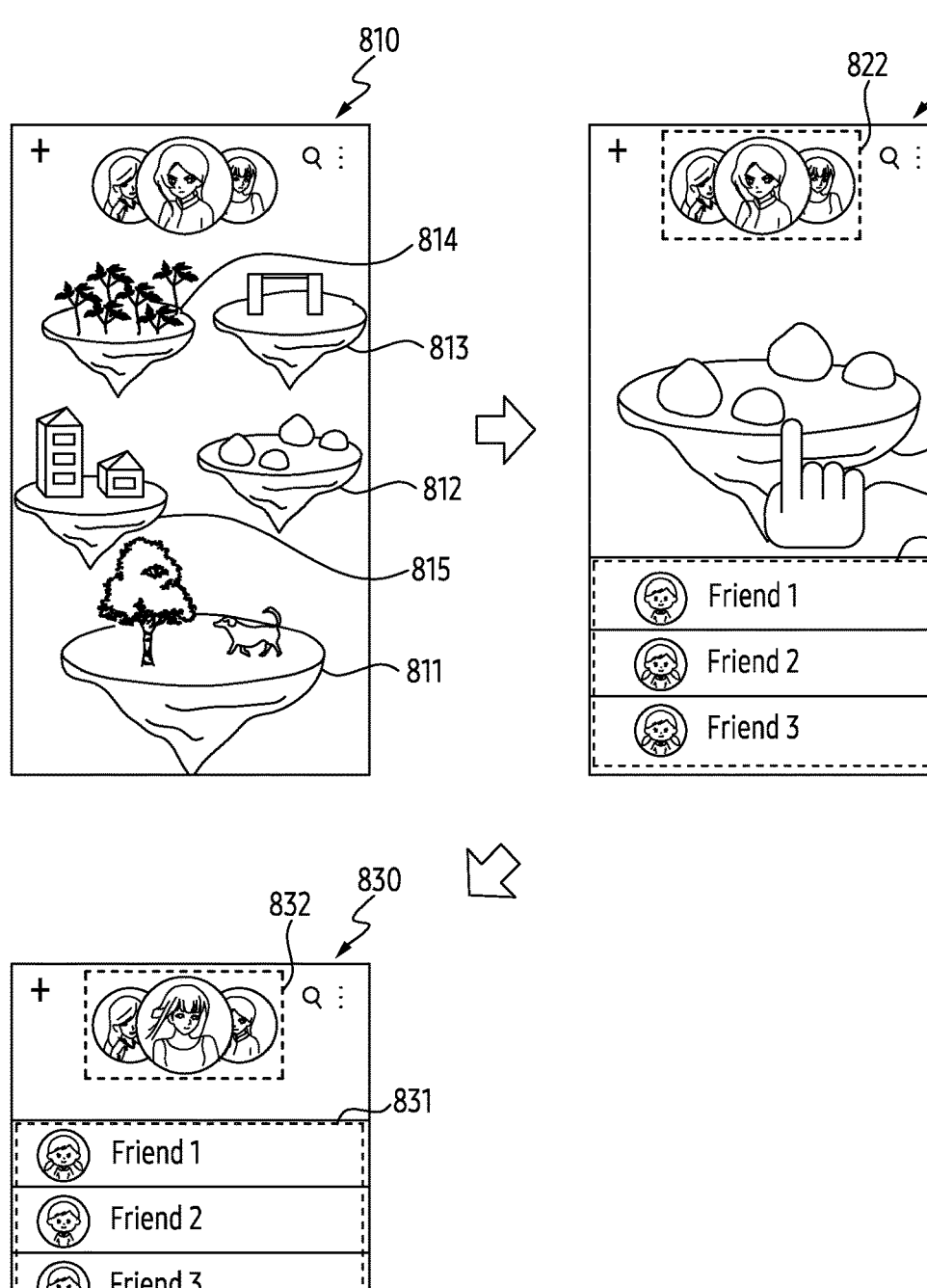
FIG. 8 is a diagram illustrating an example operation of an electronic device according to various embodiments.

FIG. 8 is a diagram illustrating an example operation of an electronic device according to various embodiments.

Referring to FIG. 8, screens 810, 820 and 830 are examples of screens displayed through the display 220 of the electronic device 200.

According to an embodiment, the processor 210 may display a plurality of objects representing a plurality of virtual spaces on the screen 810. For example, the plurality of objects may include objects 811 to 815. For example, the object 811 may represent a first virtual space. The object 812 may represent a second virtual space. The object 813 may represent a third virtual space. The object 814 may represent a fourth virtual space. The object 815 may represent a fifth virtual space.

According to an embodiment, the processor 210 may change locations and/or sizes of a plurality of objects in response to a swipe input. For example, the processor 210 may change the locations and/or sizes of the plurality of objects in response to an input moving across at least a portion of the plurality of objects.

According to an embodiment, the processor 210 may identify an input for one of a plurality of objects while the screen 810 is displayed. For example, the processor 210 may identify an input to the object 812 among the plurality of objects. The processor 210 may display information on at least one user entering the second virtual space in response to an input to the object 812. The processor 210 may change a screen of the electronic device 200 from the screen 810 to the screen 820 in response to the input to the object 812.

According to an embodiment, the processor 210 may display a plurality of objects 821 indicating at least one user who has entered the second virtual space corresponding to the object 812 on the screen 820. The processor 210 may display at least one thumbnail 822 indicating at least one user who has entered the second virtual space corresponding to the object 812 on the screen 820.

According to an embodiment, the processor 210 may identify at least one touch input 825 for the object 812. For example, the processor 210 may identify a swipe input for the object 812. The processor 210 may change a screen of the electronic device 200 from the screen 820 to the screen 830 in response to at least one touch input 825 for the object 812.

The processor 210 may display information on at least one user entered the third virtual space on the screen 830 in response to at least one touch input 825 for the object 812. The processor 210 may display a plurality of objects 831 indicating at least one user entered the third virtual space corresponding to the object 813 by overlapping the object 813. Since the plurality of objects 831 are displayed by overlapping the objects 813, the object 813 may not be displayed on the screen 830. The processor 210 may display at least one thumbnail 832 indicating at least one user corresponding to the object 813 on the screen 830.

According to an embodiment, a user who has entered one virtual space may simultaneously enter another virtual space. For example, a part of at least one user entered the second virtual space may be the same as a part of at least one user entered the third virtual space. A part of the plurality of objects 821 displayed on the screen 820 may correspond to a part of the plurality of objects 831 displayed on the screen 830.

Figure 9:
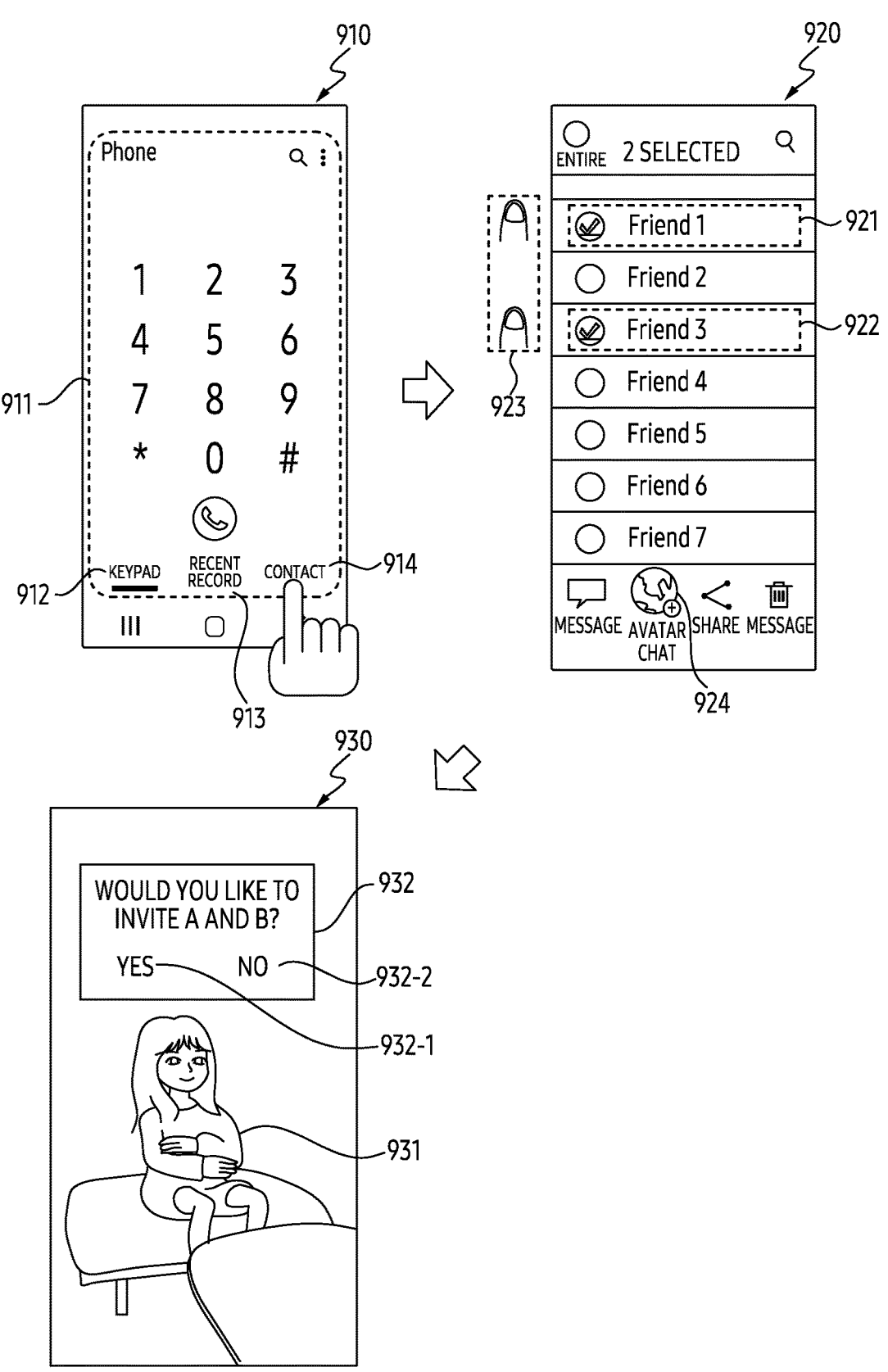
FIG. 9 is a diagram illustrating an example operation of an electronic device according to various embodiments.

FIG. 9 is a diagram illustrating an example operation of an electronic device according to various embodiments.

Referring to FIG. 9, screens 910, 920 and 930 are examples of screens displayed through the display 220 of the electronic device 200.

According to an embodiment, the processor 210 may execute a first application for communication with another user. For example, the first application may include a call application. The processor 210 may display a screen 910 indicating a first user interface of the first application.

The processor 210 may display an object 912 for displaying a keypad, an object 913 for displaying a recent call history, and an object 914 for displaying a contact information. For example, the screen 910 may be in a state in which the object 912 is selected. The processor 210 may display a keypad on the area 911 of the screen 910.

According to an embodiment, the processor 210 may identify an input for the object 914 for displaying a contact. The processor 210 may change a screen of the electronic device 200 from the screen 910 to the screen 920 in response to the input for the object 914.

According to an embodiment, the processor 210 may display a plurality of contacts stored in the memory 230 of the electronic device 200 on the screen 920. For example, the plurality of contacts may be displayed as the plurality of objects. The processor 210 may identify a user input 923 indicating that the object 921 corresponding to the first user and the object 922 corresponding to the second user are selected. The processor 210 may display the object 924 in response to the user input 923. The processor 210 may execute the second application based on an input for the object 924. The processor 210 may change a screen of the electronic device 200 from the screen 920 to the screen 930, based on the input for the object 924.

According to an embodiment, based on the user input 923, the processor 210 may identify whether users (e.g., a first user and a second user) corresponding to the selected objects (e.g., object 921 and object 922) have created characters according to the second application for providing virtual space. The processor 210 may display the object 924 based on identifying that users corresponding to the selected objects have created characters according to the second application.

According to an embodiment, the processor 210 may display the second user interface of the second application on the screen 930. The processor 210 may display a character 931 representing a user of the electronic device 200 on the screen 930. The processor 210 may display a pop-up window 932 indicating whether to invite a first user related to the object 921 and a second user related to the object 922 to the virtual space. The pop-up window 932 may display an object 932-1 accepting to invite the first user and the second user to the virtual space and an object 932-2 refusing to invite the first user and the second user to the virtual space. Based on the user input for the object 932-1, the processor 210 may transmit a signal causing the first external electronic device and the second external electronic device to display a notification for guiding entry into the virtual space to the first external electronic device of the first user and the second external electronic device of the second user.

Figure 10:
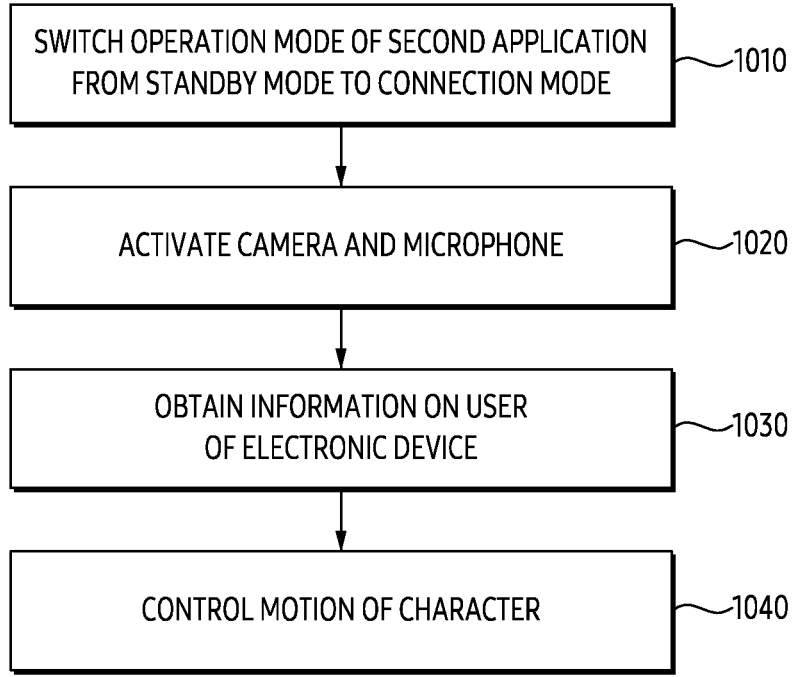
FIG. 10 is a flowchart illustrating an example operation of an electronic device according to various embodiments.

FIG. 10 is a flowchart illustrating an example operation of an electronic device according to various embodiments.

Referring to FIG. 10, in operation 1010, the processor 210 may change an operation mode of the second application from a standby mode to a connection mode. For example, the processor 210 may switch the operation mode of the second application from the standby mode to the connection mode based on identifying that at least one user enters the virtual space using at least one character.

According to an embodiment, the processor 210 may identify that at least one user enters the virtual space using at least one character. For example, the processor 210 may identify that at least one user enters the virtual space using at least one character after operation 430 of FIG. 4 is performed. The processor 210 may transmit a signal causing the at least one external electronic device to display a notification for guiding entry into the virtual space to at least one external electronic device of the at least one user. The processor 210 may identify that at least one user enters the virtual space using at least one character after the signal is transmitted.

According to an embodiment, an operation mode of the second application may include the standby mode and the connection mode. For example, the standby mode may refer to a state in which communication with another user is not achieved while the second application is running. In other words, the standby mode may refer to a state in which a call connection with an external electronic device is not established. For example, the connection mode may refer to a state in which communication with another user is possible while the second application is running. In other words, the connection mode may refer to a state in which a call connection with an external electronic device is established. According to an embodiment, the processor 210 may change the operation mode of the second application from the standby mode to the connection mode so that the user of the electronic device 200 may communicate with at least one user using a character.

In operation 1020, the processor 210 may activate a camera 250 and a microphone 260. For example, the processor 210 may activate the camera 250 and the microphone 260 while the operation mode of the second application is the connection mode.

According to an embodiment, the processor 210 may activate the camera 250 and the microphone 260 so that the user of the electronic device 200 may communicate using at least one user character. For example, while the operation mode of the second application is the standby mode, the camera 250 and the microphone 260 may be deactivated. The processor 210 may activate the camera 250 and the microphone 260 based on identifying that the operation mode of the second application is changed from the standby mode to the connection mode.

In operation 1030, the processor 210 may obtain information on the user of the electronic device 200. For example, the processor 210 may obtain information on the user of the electronic device 200 using the camera 250 and the microphone 260. The information on the user of electronic device 200 may include information on the user's expression, information on the user's emotion, information on the user's motion, and information on the user's voice.

According to an embodiment, the processor 210 may obtain an image of a part of the user's body using the camera 250. The processor 210 may obtain information on the user based on an image of a part of the user's body. For example, the processor 210 may obtain an image of the user's face using the camera 250. The processor 210 may obtain information on a user's expression and/or emotion based on the image of the user's face. According to an embodiment, the processor 210 may obtain an image of a user's body using the camera 250. The processor 210 may obtain information on the motion of the user's body based on the image of the user's body.

According to an embodiment, the processor 210 may obtain information on a sound occurred outside the electronic device 200 using the microphone 260. The processor 210 may obtain information on a user's voice based on information on a sound occurred from the outside.

In operation 1040, the processor 210 may control a motion of a character. For example, the processor 210 may control a motion of a character representing a user of the electronic device 200 based on the information on the user.

For example, the processor 210 may change an expression of a character representing a user based on information on the user's expression and/or emotion. For example, the processor 210 may change a motion of a character representing the user based on information on the motion of the user. For example, the processor 210 may change the motion (or mouth shape) of the character's mouth based on information on the user's voice.

Figure 11:
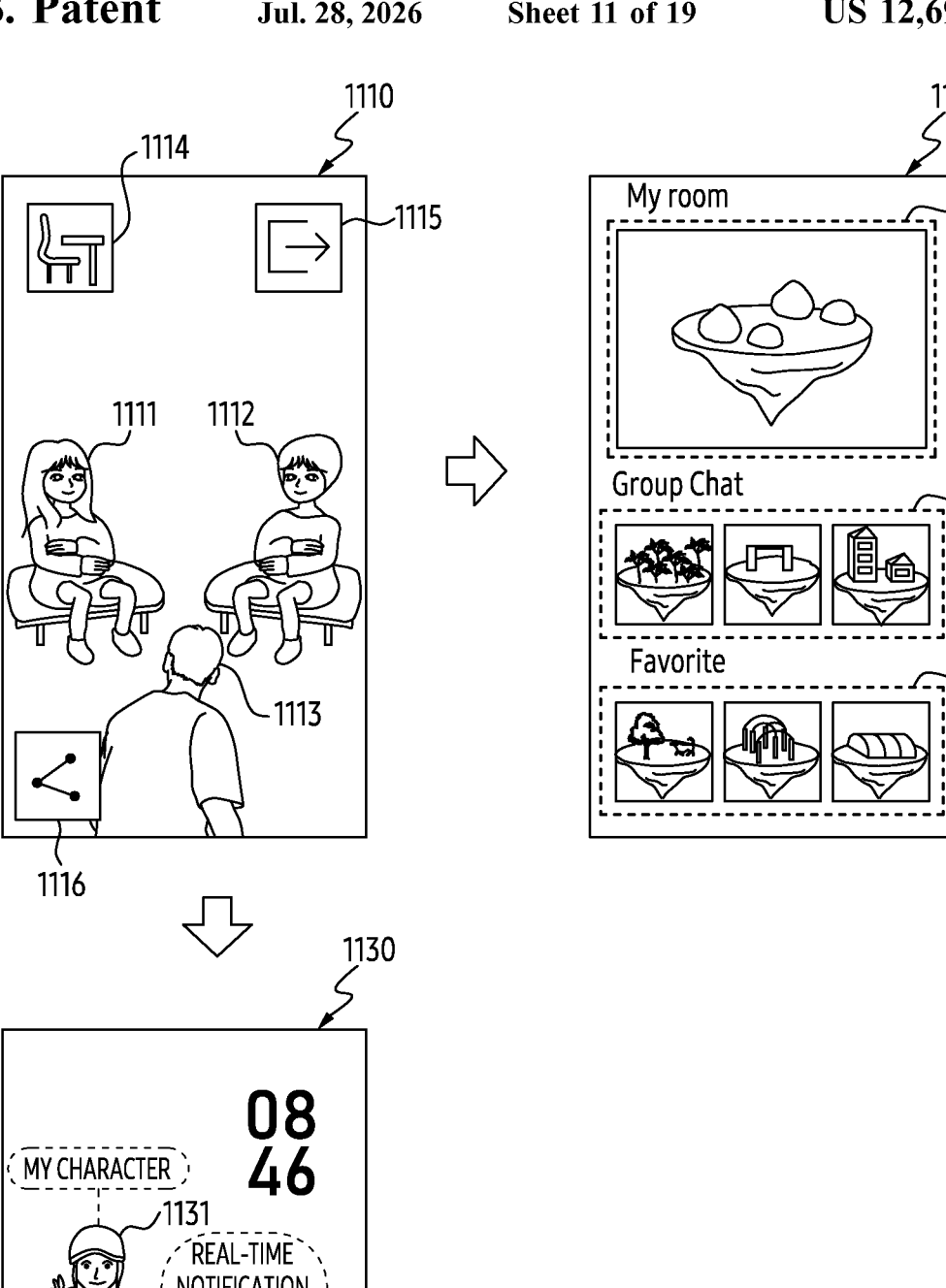
FIG. 11 is a diagram illustrating an example operation of an electronic device according to various embodiments.

FIG. 11 is a diagram illustrating an example operation of an electronic device according to various embodiments.

Referring to FIG. 11, screens 1110, 1120 and 1130 are examples of screens displayed through the display 220 of the electronic device 200.

According to an embodiment, the processor 210 may display a character 1111 representing a user of the electronic device 200 and at least one character (e.g., character 1112 and character 1113) representing at least one user on the screen 1110.

According to an embodiment, the processor 210 may control (or change) a motion of the character 1111 based on information on the user of the electronic device 200. For example, the processor 210 may obtain information on the user using the camera 250 and the microphone 260. The processor 210 may control the motion of the character 1111 based on the obtained information on the user. For example, the processor 210 may obtain information on a user's expression using the camera 250. The processor 210 may change the expression of the character 1111 based on the obtained information on the user's expression. For example, the processor 210 may change the movement of the mouth of the character 1111 based on information on the user's voice obtained using the microphone 260. The processor 210 may change the movement of the mouth of the character 1111 and simultaneously output the obtained user's voice using the speaker 270.

According to an embodiment, the processor 210 may transmit a signal configured to cause at least one external electronic device to change the motion of the character 1111 representing the user of the electronic device 200 in at least one external electronic device. According to an embodiment, the processor 210 may receive a signal for changing the motion of at least one character from at least one external electronic device. For example, the processor 210 may receive a signal for changing a motion of the character 1112 from the first external electronic device corresponding to the character 1112. The first external electronic device may transmit a signal for changing the motion of the character 1112 to the electronic device 200 based on information on the user of the first external electronic device. The processor 210 may change the motion of the character 1112 based on a signal transmitted from the first external electronic device. For example, the processor 210 may receive a signal for changing a motion of the character 1113 from the second external electronic device corresponding to the character 1113. The processor 210 may change the motion of the character 1113 based on a signal transmitted from the second external electronic device.

According to an embodiment, the processor 210 may display a plurality of visual objects for controlling an activity of the character 1111 by overlapping the virtual space in the screen 1110. For example, the plurality of visual objects may include a visual object 1114, a visual object 1115, and a visual object 1116. For example, the visual object 1114 may be used to switch the operation mode of the second application from connection mode to standby mode. For example, the visual object 1115 may be used to exit the virtual space. For example, the visual object 1116 may be used to display content in the virtual space.

According to an embodiment, the processor 210 may identify an input to the visual object 1114. The processor 210 may identify an input to the visual object 1114 for changing the operation mode of the second application. For example, the processor 210 may switch the operation mode of the second application from the connection mode to the standby mode based on the input for the visual object 1114. The processor 210 may deactivate the camera 250 and the microphone 260 while the operation mode of the second application is the standby mode.

According to an embodiment, based on the input for the visual object 1114, the processor 210 may transmit a signal to cause the at least one external electronic device to indicate that the user of the electronic device 200 is in an away state.

According to an embodiment, the processor 210 may change the screen of the electronic device 200 from the screen 1110 to the screen 1120 based on the input for the visual object 1114. According to an embodiment, the processor 210 may display the screen 1120 while the operation mode of the second application is the standby mode. The processor 210 may display a virtual space 1121 allocated to the user of the electronic device 200, at least one virtual space 1122 that can be entered, at least one virtual space 1123 set as a favorite on the on the screen 1120. For example, the at least one virtual space 1122 that can be entered include at least one virtual space in which the user of the electronic device 200 is set to be away. For example, the user of the electronic device 200 may enter a selected virtual space by selecting the virtual space for entry from among the virtual spaces (e.g., virtual space 1121, at least one virtual space 1122, and at least one virtual space 1123) displayed on the screen 1120. According to an embodiment, the user of the electronic device 200 may simultaneously enter one or more virtual spaces using a character representing the user. The processor 210 may display a list of one or more virtual spaces into which the current user has entered using a character representing the user.

According to an embodiment, the processor 210 may identify a user input for the user to enter another virtual space distinguished from the virtual space while the user of the electronic device 200 enters the virtual space using the character representing the user. For example, the processor 210 may identify an input to object 1114 as a user input for entering another virtual space distinguished from the virtual space. Based on the user input, the processor 210 may display a list of virtual spaces entered by the user, including the virtual space and the other virtual spaces on the screen 1120.

According to an embodiment, the processor 210 may identify an input for the visual object 1115 while the screen 1110 is displayed. The processor 210 may identify an input for the visual object 1115 for exiting from the virtual space. The processor 210 may suspend execution of the second application based on the input to the visual object 1115. The processor 210 may change a screen of the electronic device 200 from the screen 1110 to the screen 1130, based on the input to the visual object 1115.

According to an embodiment, the processor 210 may display a home screen on the screen 1130. The processor 210 may display a part 1131 of a character representing the user of the electronic device 200 on the home screen. The processor 210 may display a notification related to the second application and/or a notification related to a character representing a user in association with the part 1131 of the character displayed on the home screen. For example, the processor 210 may display at least one of the number of other users following the virtual space of the user of the electronic device 200, the number of visitors to the user's virtual space, calling other user, and/or conversation with other user, on the screen 1130 in association with the part 1131.

Figure 12:
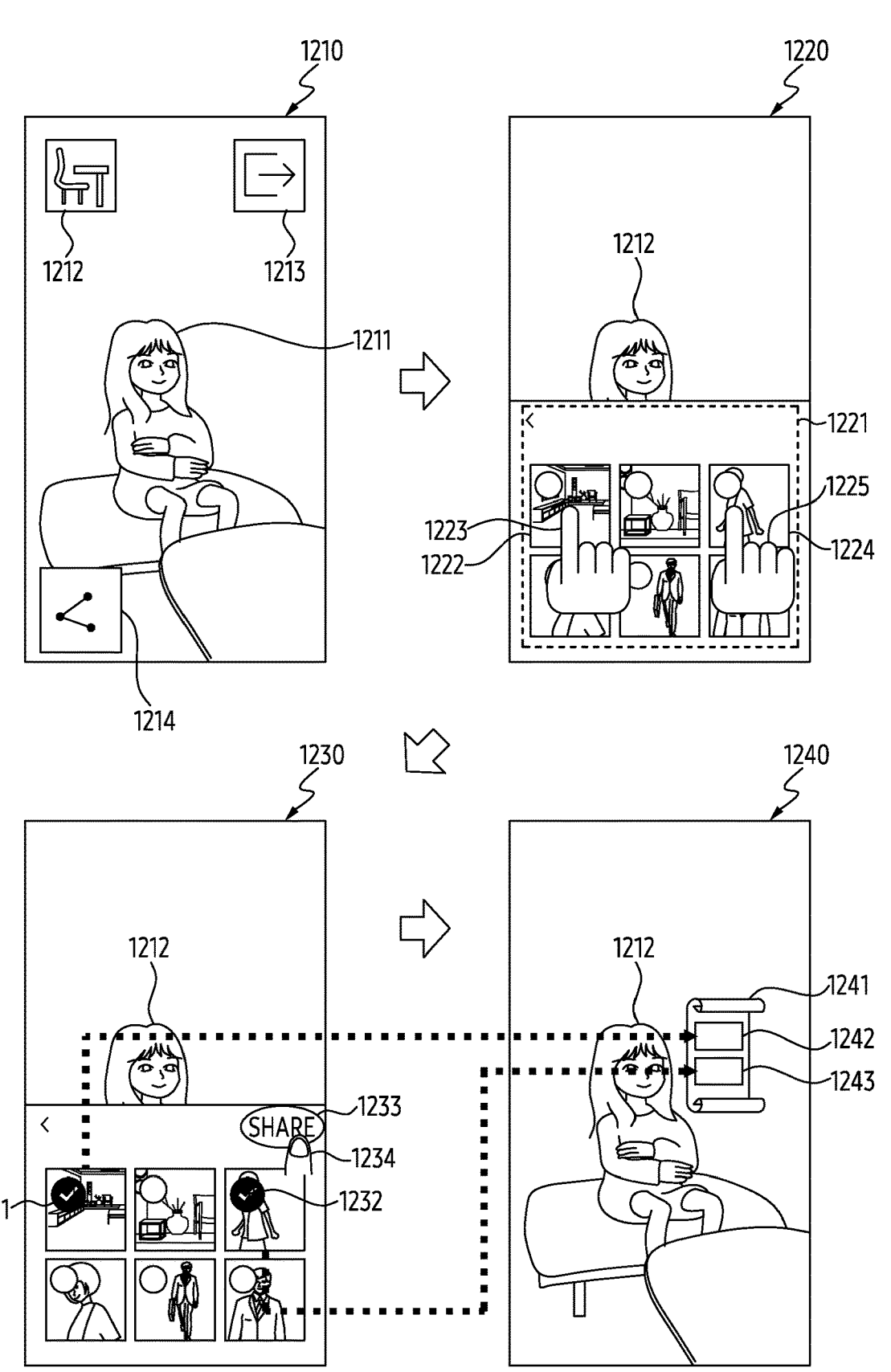
FIG. 12 is a diagram illustrating an example operation of an electronic device according to various embodiments.

FIG. 12 is a diagram illustrating an example operation of an electronic device according to various embodiments.

Referring to FIG. 12, the processor 210 may display a character 1211 representing a user of the electronic device 200 in a second user interface of the second application. Although only the character 1211 is illustrated in FIG. 12, the processor 210 may further display at least one character representing at least one user.

According to an embodiment, the processor 210 may display a plurality of visual objects for controlling an activity of the character 1211 in a virtual space by overlapping the virtual space on the screen 1210. The plurality of visual objects may include a visual object 1212, a visual object 1213, and a visual object 1214. For example, the visual object 1212 may correspond to the visual object 1114 of FIG. 11. The visual object 1213 may correspond to the visual object 1115 of FIG. 11. The visual object 1214 may correspond to the visual object 1116 of FIG. 11.

According to an embodiment, the processor 210 may identify an input for the visual object 1214 for displaying content in a virtual space. The processor 210 may change a screen of the electronic device 200 from the screen 1210 to the screen 1220 based on an input for the visual object 1214.

According to an embodiment, based on the input to visual object 1214, the processor 210 may provide an area 1221 for selecting at least one content to be displayed in the virtual space by overlapping the virtual space, on the screen 1220. The processor 210 may display a plurality of contents stored in the memory 230 in the area 1221.

For example, the processor 210 may identify an input for selecting a part of the plurality of contents. The processor 210 may identify an input 1223 for the content 1222 and an input 1225 for the content 1224. The processor 210 may change a screen of the electronic device 200 from the screen 1220 to the screen 1230 based on the input 1223 and the input 1225.

According to an embodiment, the processor 210 may display the screen 1230 based on the input 1223 and the input 1225. The processor 210 may indicate that the content 1222 and the content 1224 are selected based on the input 1223 and the input 1225. For example, the processor 210 may indicate that the content 1222 and the content 1224 are selected by changing shapes of the object 1231 and the object 1232. The processor 210 may indicate that the content 1222 and the content 1224 are selected by changing the shapes of the object 1231 and the object 1232 including check boxes. After the content 1222 and the content 1224 are selected, the processor 210 may identify an input 1234 for an object 1233. The object 1233 may be used to complete the selection of at least one content to be displayed in the virtual space. The processor 210 may change a screen of the electronic device 200 from the screen 1230 to the screen 1240, based on the input 1234.

According to an embodiment, the processor 210 may display the screen 1240 based on the input 1234. The processor 210 may display the character 1212 and at least one content in association with character 1212 on the screen 1240. For example, the processor 210 may display a thumbnail 1242 indicating the content 1222 and a thumbnail 1243 indicating the content 1224 in an area 1241. The processor 210 may set the area 1241 in association with the character 1212. For example, the processor 210 may change a posture of the character 1212 to a posture of displaying content to other characters. The processor 210 may set the area 1241 around the character 1212, and display a thumbnail 1242 and a thumbnail 1243 in the area 1241.

According to an embodiment, the processor 210 may display content 1222 corresponding to the thumbnail 1242, based on an input related to one of the thumbnail 1242 and the thumbnail 1243. According to an embodiment, an external electronic device related to another character entering the virtual space together with the character 1212 may also display the thumbnail 1242 and the thumbnail 1243. The other external electronic device may display the content 1222 corresponding to the thumbnail 1242, based on an input related to one of the thumbnail 1242 and the thumbnail 1243.

Figure 13:
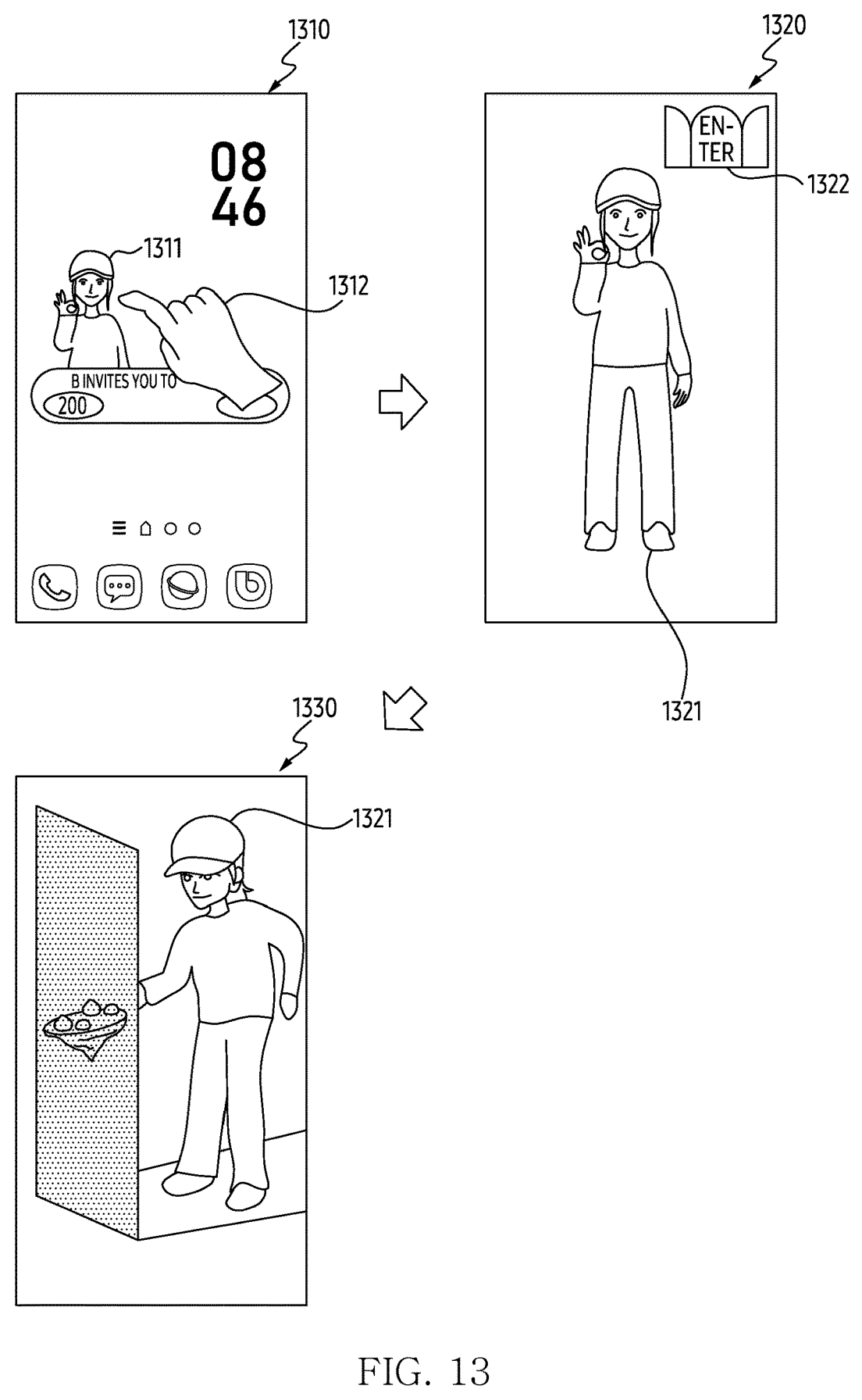

FIG. 13 is a diagram illustrating an example operation of an electronic device according to various embodiments.

Referring to FIG. 13, screens 1310, 1320 and 1330 are examples of screens displayed through the display 220 of the electronic device 200.

According to an embodiment, the processor 210 may display a home screen on the screen 1310. The processor 210 may display a part 1311 of a character representing a user of the electronic device 200 on the home screen. The processor 210 may display a notification related to the second application and/or a notification related to a character representing the user in association with a part 1311 of the character displayed on the home screen. For example, the processor 210 may display at least one of the number of other users following the virtual space of the user of the electronic device 200, the number of visitors to the user's virtual space, calling other user, and/or conversation with other user, on the screen 1310 in association with the part 1311 of the character. For example, the screen 1310 may correspond to the screen 1130 of FIG. 11.

According to an embodiment, the processor 210 may identify at least one touch input 1312 for a part 1311 of the character. The at least one touch input 1312 may be set as one of a tap input, a double tap input, a long press input, and a swipe input for the part of the character 1311. For example, the processor 210 may change a screen of the electronic device 200 from the screen 1310 to the screen 1320 based on a swipe input to the part 1311 of the character.

According to an embodiment, the processor 210 may display the screen 1320 based on at least one touch input 1312 for the part of the character 1311. The processor 210 may display a character 1321 representing a user of the electronic device 200 on the screen 1320. According to an embodiment, the processor 210 may identify an input indicating a selection of the character 1321 among a plurality of characters representing the user of the electronic device 200. The processor 210 may display a screen 1320 including the character 1321 based on an input indicating a selection of the character 1321 among the plurality of characters.

According to an embodiment, the processor 210 may obtain information on the character 1321 representing a user of the electronic device 200 set in the second application when a touch input for the part 1311 of the character occurred among at least one touch input 1312. For example, the processor 210 may request information on the character 1321 representing the user of the electronic device 200 from a server related to the second application when a touch input for the part 1311 of a character occurred among at least one touch input 1312. The processor 210 may receive information on the character 1321 representing the user of the electronic device 200 from the server. The processor 210 may temporarily store information on the character 1321 representing the user of the electronic device 200 in the memory 230. After at least one touch input 1312 is completed, the processor 210 may display the character 1321 on the screen 1320 based on information on the character 1321 representing the user of the electronic device 200 temporarily stored. The processor 210 may display the screen 1320 faster by obtaining information on the character 1321 in advance in response to the occurrence of a touch input for the part 1311 of the character.

According to an embodiment, the processor 210 may display a screen 1320 indicating that it is scheduled to enter the virtual space using the character 1321. The processor 210 may provide a virtual space including the character 1321 displayed on the screen 1320 based on an input for the object 1322. The processor 210 may change a screen of the electronic device 200 from the screen 1320 to the screen 1330 based on the input for the object 1322.

According to an embodiment, the processor 210 may display the screen 1330 based on the input to the object 1322. The processor 210 may display the screen 1330 indicating that the character 1321 enters the virtual space while receiving (or loading) information on the virtual space.

According to an embodiment, the processor 210 may receive from at least one of a plurality of external electronic devices corresponding to a plurality of users a signal to cause a notification for guiding entry into one of a plurality of virtual spaces. The processor 210 may provide the notification for guiding entry into one of the plurality of virtual spaces using a part of the character displayed on the home screen. While the notification is provided, in response to identifying at least one touch input for part 1311 of the character, the processor 210 may enter one of the plurality of virtual spaces using the character 1321 by executing the second application.

Figure 14A:
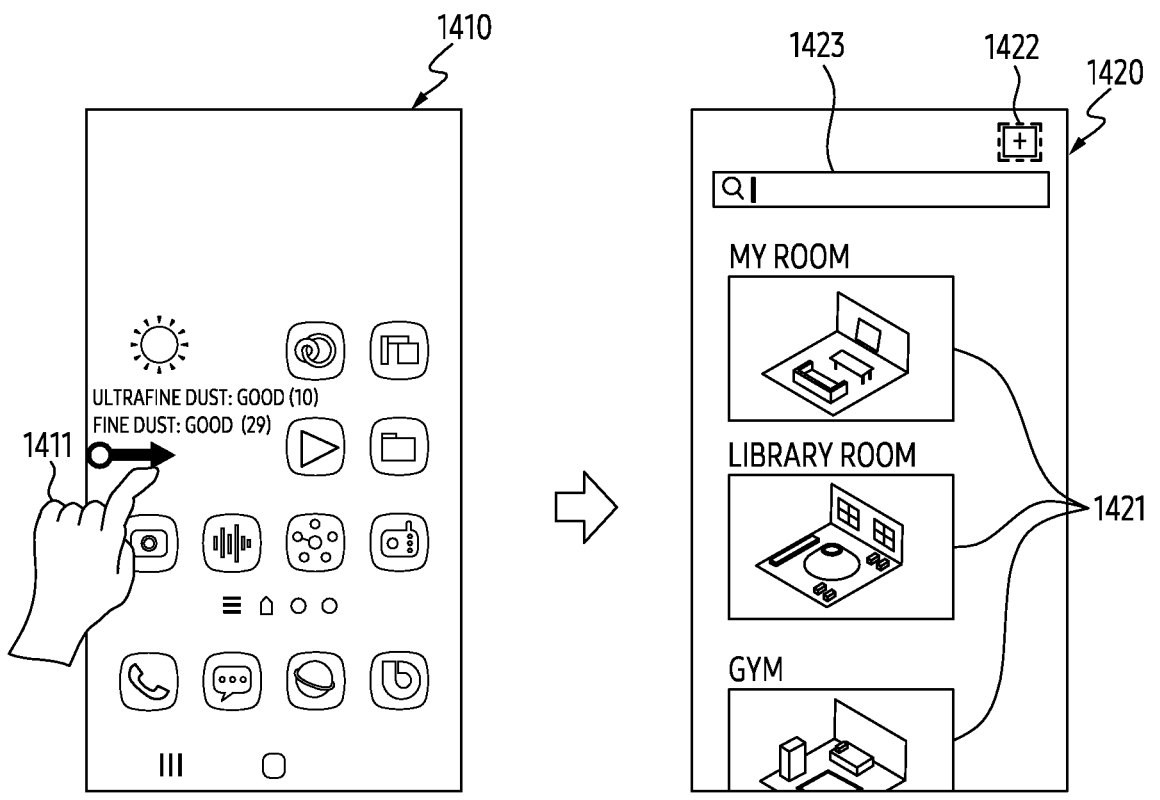
FIG. 14A is a diagram illustrating an example operation of an electronic device according to various embodiments.

FIG. 14A is a diagram illustrating an example operation of an electronic device according to various embodiments.

Figure 14B:
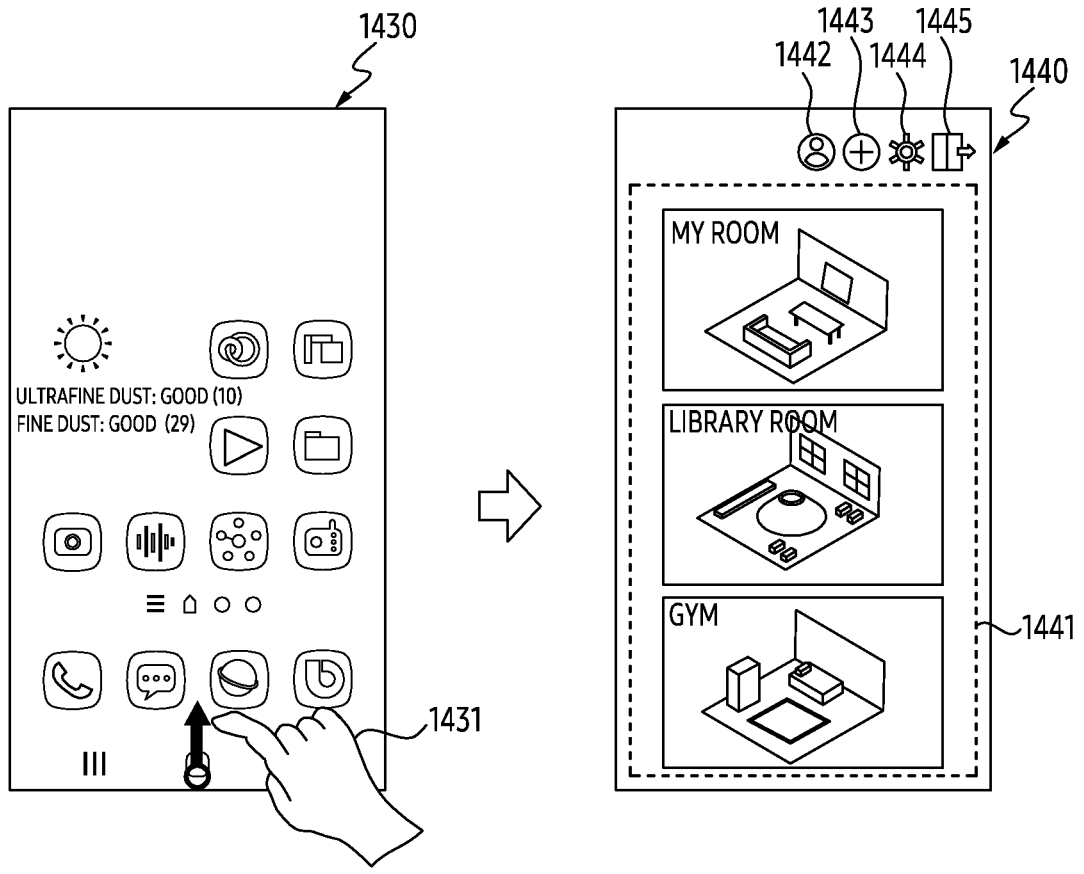
FIG. 14B is a diagram illustrating an example operation of an electronic device according to various embodiments.

FIG. 14B is a diagram illustrating an example operation of an electronic device according to various embodiments.

Referring to FIG. 14A, the processor 210 may display a home screen on the screen 1410. While the home screen is being displayed, the processor 210 may set at least one touch input 1411 for a user to enter the virtual space using a character representing the user. For example, the processor 210 may identify at least one touch input 1411 in a direction perpendicular to the left periphery of the screen 1410 with respect to the left periphery. The processor 210 may change a screen of the electronic device 200 from the screen 1410 to the screen 1420 in response to identifying at least one touch input 1411.

According to an embodiment, in response to identifying at least one touch input 1411 on the home screen, the processor 210 may display a plurality of images 1421 representing a plurality of virtual spaces, which can be entered in a state that the execution of the second application is suspended on the screen 1420.

For example, the plurality of virtual spaces may be virtual spaces in which a user of the electronic device 200 can enter. The processor 210 may display a plurality of images 1421 indicating a plurality of virtual spaces on the screen 1420 so that the user enters one of the plurality of virtual spaces. The processor 210 may display a virtual space corresponding to the selected image together with a character representing the user based on an input to one of the plurality of images 1421.

According to an embodiment, the processor 210 may display an object 1422 for adding a new virtual space on the screen 1420. The processor 210 may add a new virtual space distinguished from the plurality of virtual spaces based on an input for the object 1422.

According to an embodiment, the processor 210 may display a search field 1423 for searching a plurality of virtual spaces on the screen 1420. The processor 210 may identify that at least one of a title of the virtual space, at least one tag allocated to the virtual space, and a name of a user entered the virtual space is inputted to the search field 1423. The processor 210 may display one or more virtual space related to at least one of a title of the virtual space, at least one tag allocated to the virtual space, and a name of a user entered the virtual space among the plurality of virtual spaces.

Although not shown, the processor 210 may display an object for arranging the plurality of virtual spaces on the screen 1420. The processor 210 may change an arrangement of the plurality of images 1421 according to an arrangement scheme set in the object based on an input for the object for arranging the plurality of virtual spaces.

Referring to FIG. 14B, the processor 210 may display a home screen on the screen 1430. While the home screen is displayed, the processor 210 may set at least one touch input 1431 for entering the virtual space using a character representing the user. For example, the processor 210 may identify at least one touch input 1431 in a direction perpendicular to a lower periphery of the screen 1430 with respect to the lower periphery. The processor 210 may change a screen of the electronic device 200 from the screen 1430 to the screen 1440 in response to identifying at least one touch input 1431.

According to an embodiment, the processor 210 may execute a second application in response to identifying at least one touch input 1431 within the home screen. The processor 210 may display a plurality of images 1441 indicating a plurality of virtual spaces, which can be entered on the screen 1440 in a state that the second application is executed.

For example, the processor 210 may display an object 1442 for changing user information set within the second application on the screen 1440. The processor 210 may display an object 1443 for adding a new virtual space on the screen 1440. The processor 210 may display an object 1444 for changing a setting of the second application on the screen 1440. The processor 210 may display an object 1445 for suspending execution of the second application on the screen 1440.

FIG. 15 is a flowchart illustrating an example operation of an electronic device according to various embodiments.

Referring to FIG. 15, in operation 1510, the processor 210 may display a message including at least one word related to the virtual space provided using the second application while the first application is being executed. For example, the processor 210 may display a message including at least one word related to the virtual space provided using the second application while the first application for communication with another user distinguished from the user of the electronic device 200 is executed.

According to an embodiment, the processor 210 may execute a first application. For example, the first application may be used for communication with another user. For example, the first application may include a messenger application.

According to an embodiment, the processor 210 may display a message. The processor 210 may display a message on the first user interface of the first application. The displayed message may include a message received from an external electronic device and/or a message transmitted from the electronic device 200 to the external electronic device.

For example, the message displayed on the first user interface may include at least one word related to a virtual space provided using the second application. The processor 210 may identify text included in the displayed message and identify that at least one word related to the virtual space provided using the second application is included in the text included in the message.

According to an embodiment, the processor 210 may change and display the shape (e.g., font, size, or color) of the at least one word. The processor 210 may change and display only the shape of the at least one word among text included in the message.

In operation 1520, the processor 210 may display a second user interface including an object for executing a second application for communicating with another user through a character representing a user. For example, the processor 210 may display a second user interface including an object for executing a second application for communicating with another user through a character representing a user in a virtual space, by overlapping the first user interface of the first application, based on identifying at least one word included in the message.

According to an embodiment, the second user interface may include a touch keyboard or a soft input panel (SIP). The processor 210 may display the second user interface based on a touch input for the input panel included in the first user interface.

For example, the processor 210 may display the second user interface including the object for executing the second application, based on identifying at least one word related to the virtual space provided using the second application within the conversation window within the first user interface. For example, an object for executing the second application may be displayed within a second area among a first area for displaying a touch keyboard and the second area for providing additional functions.

For example, based on identifying that at least one word related to the virtual space provided using the second application is not displayed within the conversation window within the first user interface. The processor 210 may display the second user interface that does not include an object for executing the second application.

In operation 1530, the processor 210 may change the first user interface to the third user interface of the second application. For example, based on the user input to the object for executing the second application, The processor 210 may change the first user interface to the third user interface of the second application, including a virtual space including a character representing a user of the electronic device 200 and another character representing another user.

According to an embodiment, the processor 210 may identify a user input for an object for executing the second application. The processor 210 may execute the second application based on the identified user input. The processor 210 may display a third user interface of the second application by executing the second application. For example, the third user interface may include a virtual space including a character representing a user of the electronic device 200 and another character representing another user.

Figure 16A:
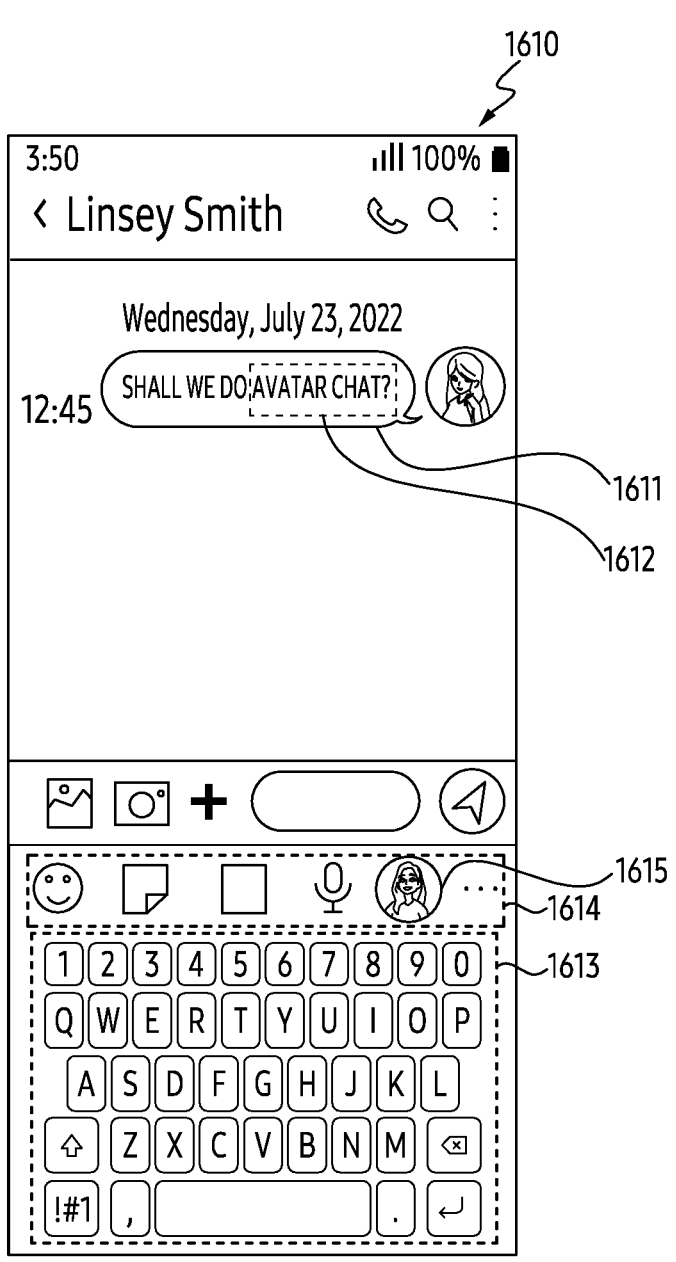
FIG. 16A is a diagram illustrating an example operation of an electronic device according to various embodiments.

FIG. 16A is a diagram illustrating an example operation of an electronic device according to various embodiments.

Figure 16B:
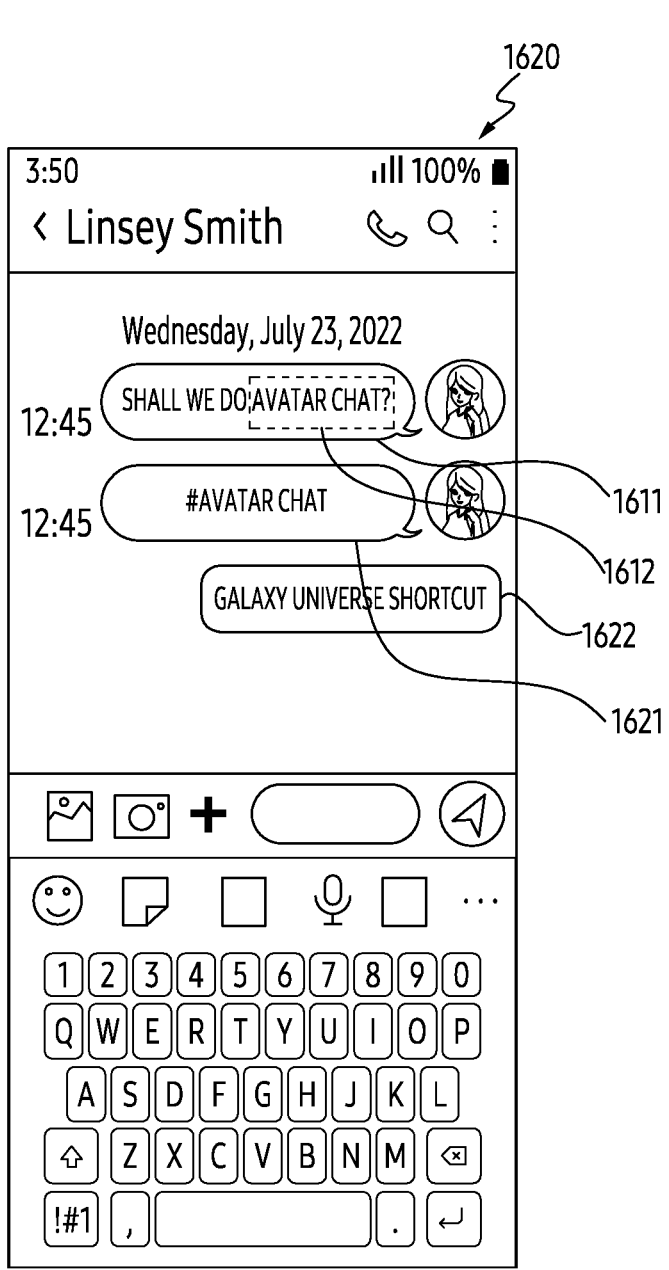
FIG. 16B is a diagram illustrating an example operation of an electronic device according to various embodiments.

FIG. 16B is a diagram illustrating an example operation of an electronic device according to various embodiments.

Referring to FIG. 16A, the processor 210 may display a first user interface of a first application on a screen 1610. For example, the processor 210 may display a user interface related to a messenger application, which is an example of the first application.

According to an embodiment, the processor 210 may display a message 1611 including at least one word 1612 related to a virtual space provided using the second application in the first user interface of the first application while the first application is executed. The processor 210 may identify that the message 1611 includes at least one word 1612 related to the virtual space provided using the second application. According to an embodiment, the processor 210 may change and display a shape of the at least one word 1612.

According to an embodiment, the processor 210 may display a second user interface including an object 1615 for executing the second application on the screen 1610. For example, the second user interface may be divided into a first area 1613 for providing a touch keyboard and a second area 1614 for providing additional functions. The processor 210 may display the touch keyboard in the first area 1613 of the second user interface. The processor 210 may display a plurality of objects for providing additional functions to the second area 1614 of the second user interface. For example, the plurality of objects may include object 1615 for executing the second application. The object 1615 may be configured as a thumbnail of a character representing a user of the electronic device 200. According to an embodiment, the processor 210 may execute the second application and may provide (or display) a virtual space, which can be entered through a character representing the user of the electronic device 200 based on identifying the input to object 1615, based on identifying an input to the object 1615.

Referring to FIG. 16B, the processor 210 may display a first user interface of a first application on a screen 1620. According to an embodiment, the processor 210 may display a message 1611 including at least one word 1612 related to a virtual space provided using the second application, while the first application is being executed, within the first user interface of the first application. The processor 210 may identify that the message 1611 includes at least one word 1612 related to the virtual space provided using the second application.

According to an embodiment, the processor 210 may transmit the message 1621 in response to identifying that the message 1611 includes at least one word 1612 related to the virtual space provided using the second application. The processor 210 may transmit a message 1621 for providing a link to enter the virtual space using the second application. The processor 210 may transmit the message 1621 based on the message 1611, without additional input from the user of the electronic device 200. In response to the transmission of the message 1621, the processor 210 may display a button 1622 for entering the virtual space using the second application.

For example, the processor 210 may provide (or display) a virtual space provided through the second application in response to an input for one of the message 1621 and the button 1622. The external electronic device receiving the message 1621 may also provide (or display) a virtual space provided through the second application in response to an input for one of the message 1621 and the button 1622.

Figure 17:
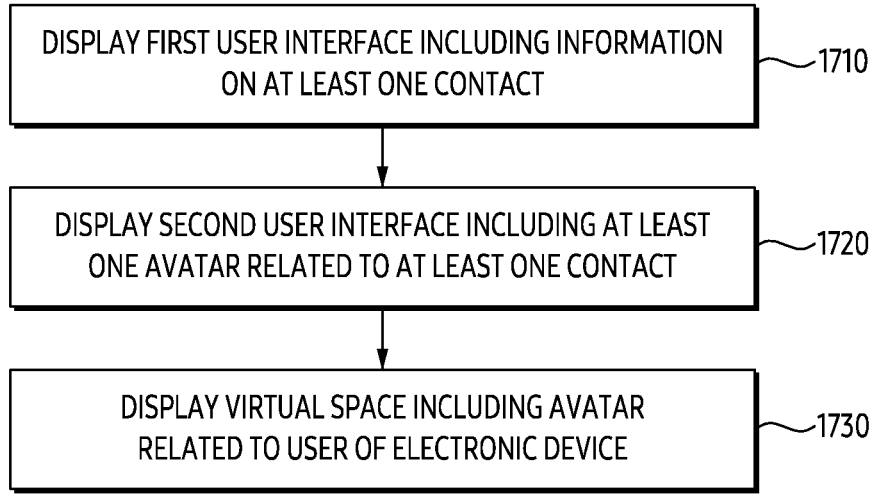
FIG. 17 is a flowchart illustrating an example operation of an electronic device according to various embodiments.

FIG. 17 is a flowchart illustrating an example operation of an electronic device according to various embodiments.

Referring to FIG. 17, in operation 1710, the processor 210 may display a first user interface including information on at least one contact. For example, the processor 210 may display a first user interface including information on at least one contact using the display 220.

According to an embodiment, the processor 210 may display a first user interface of the first application. For example, the first application may be used for communication with another user. For example, the first application may include a contact application.

In operation 1720, the processor 210 may display a second user interface including at least one avatar for at least one contact. For example, the processor 210 may display a second user interface including at least one avatar (or at least one character) for at least one contact using the display 220 based on identifying the first user input for operating in avatar mode while the first user interface is displayed.

According to an embodiment, the processor 210 may identify a first user input for operating in the avatar mode while the first user interface is displayed. For example, the processor 210 may identify a first user input for an element displayed in the first user interface.

According to an embodiment, the first application related to the first user interface may operate in one of a contact mode and an avatar mode. For example, the processor 210 may display information on at least one contact through the first user interface while the first application operates in the contact mode. The processor 210 may display at least one avatar (or at least one thumbnail of the at least one avatar) for at least one contact through the second user interface while the first application operates in the avatar mode.

According to an embodiment, the processor 210 may identify at least one external electronic device related to at least one contact. The processor 210 may receive information on a state of at least one user from at least one external electronic device. The processor 210 may display at least one object (or label) on the second user interface based on information on the state of the at least one user. The processor 210 may display at least one object for indicating a state of the at least one user together with at least one avatar on the second user interface.

In operation 1730, the processor 210 may display a virtual space including an avatar related to a user of the electronic device 200. For example, the processor 210 may display a virtual space including an avatar for a user of the electronic device 200 based on a second user input to select a first contact from among at least one contact displayed in the second user interface.

According to an embodiment, the processor 210 may display a virtual space including an avatar related to a user of the electronic device 400, based on the second user input for selecting the first contact, while at least one avatar is displayed through the second user interface. For example, the virtual space may include an avatar related to another user related to the first contact and an avatar related to the user of the electronic device 200. For example, the processor 210 may display the virtual space including the avatar related to the user and the avatar related to the other user.

According to an embodiment, the processor 210 may transmit a signal to cause the external electronic device to provide a notification for guiding the external electronic device for the first contact to display the virtual space to the external electronic device using the avatar related to other user of the external electronic devices, based on the second user input.

According to an embodiment, the processor 210 may identify a third user input for changing an avatar related to a user while the second user interface is displayed. For example, the user of the electronic device 200 may be in a state in which a character used in a virtual space is set. The processor 210 may identify the third user input for changing a character set by the user of the electronic device 200. The processor 210 may display a screen (or window) for changing a shape of the avatar related to the user based on the third user input. For example, the processor 210 may display selectable characters. For example, the processor 210 may display a screen for changing a detailed shape (e.g., eyes, nose, mouth, head, and body type) of the avatar.

The processor 210 may display a screen for changing the shape of the avatar related to the user, and then change the avatar related to the user based on at least one identified user input. The processor 210 may display the changed avatar in the virtual space. For example, the processor 210 may change the shape of the avatar related to the user. The processor 210 may display an avatar having the changed shape in a virtual space.

According to an embodiment, the user of the electronic device 200 may be in a state in which a character used in the virtual space is not set. When the user of the electronic device 200 does not set a character used in the virtual space, the processor 210 may identify a fourth user input for creating an avatar related to the user.

According to an example embodiment, an electronic device may comprise: a display, a communication circuit, a memory configured to store executable instructions, and at least one processor configured to execute the instructions by accessing the memory. The at least one processor may be further configured, when the instructions are executed, while a first application for communication with another user is being executed, to: identify a first input representing selecting at least one object corresponding to at least one user among a plurality of objects corresponding to a plurality of users distinct from a user of the electronic device displayed in a first user interface of the first application. The at least one processor may be configured to, when the instructions are executed, based on the first input being identified, identify a second input for executing a second application for communicating the at least one user through a character representing the user in a virtual space. The at least one processor may be further configured to, when the instructions are executed, based on the first input and the second input, change the first user interface to a second interface of the second application including the virtual space including the character and at least one character representing the at least one user. The at least one processor may be further configured to, when the instructions are executed, based on the first input and the second input, control the communication circuit to transmit, to at least one external electronic device of the least one user, a signal configured to cause the at least one external electronic device to display a notification for guiding entry into the virtual space.

According to an example embodiment, the at least one processor may be configured to, when the instructions are executed, identify the virtual space based on a third input representing that one of a plurality of virtual spaces is selected.

According to an example embodiment, the at least one processor may be configured to, when the instructions are executed, control the display to display an element displaying the plurality of objects while a plurality of contacts are displayed in the first user interface based on execution of the first application. The at least one processor may be further configured to, when the instructions are executed, in response to a fourth input for the element, display the plurality of objects respectively corresponding to the plurality of users in the first user interface.

According to an example embodiment, the plurality of objects respectively corresponding to the plurality of users may comprise a plurality of thumbnails of a plurality of characters respectively corresponding to the plurality of users, and a plurality of labels indicating states of the plurality of users in association with the plurality of thumbnails.

According to an example embodiment, the electronic device may further comprise global positioning system (GPS) circuit. The at least one processor may be configured to, when the instructions are executed, control the display to display a thumbnail of the character and a label indicating a state of the user of the electronic device in a first area of the first area and the second area configured in the first user interface. The at least one processor may be further configured to, when the instructions are executed, control the display to display the plurality of labels in the second area of the first area and the second area. The label indicating the state of the user of the electronic device may be displayed based on a location of the user identified based on the GPS circuit.

According to an example embodiment, the electronic device may further comprise a camera and a microphone. The at least one processor may be further configured to, when the instructions are executed, switch an operation mode of the second application from a standby mode to a connection mode based on identifying that the at least one user enters the virtual space using the at least one character. The at least one processor may be further configured to, when the instructions are executed, activate the camera and the microphone while the operation mode of the second application is the connection mode. The at least one processor may be further configured to, when the instructions are executed, obtain information on the user of the electronic device using the camera and the microphone. The at least one processor may be further configured to, when the instructions are executed, based on the information on the user, control motion of the character.

According to an example embodiment, the at least one processor may be further configured to, when the instructions are executed, control the display to display a plurality of visual objects for controlling activity of the character in the virtual space, superimposed on the virtual space based on the at least one user entering the virtual space using the at least one character.

According to an example embodiment, the at least one processor may be further configured to, when the instructions are executed, identify an input for a first visual object for displaying content in the virtual space, among the plurality of visual objects. The at least one processor may be further configured to, when the instructions are executed, based on the input for the first visual object, control the display to display at least one content among a plurality of contents stored in the memory in association with the character in the virtual space.

According to an example embodiment, the at least one processor may be further configured to, when the instructions are executed, identify an input for a second visual object for changing the operation mode of the second application among the plurality of visual objects. The at least one processor may be further configured to, when the instructions are executed, switch the operation mode of the second application from the connection mode to the standby mode based on the input for the second visual object. The at least one processor may be further configured to, when the instructions are executed, while the operation mode of the second application is the standby mode, deactivate the camera and the microphone.

According to example an embodiment, the at least one processor may be further configured to, when the instructions are executed, identify an input for a third visual object for exiting the virtual space among the plurality of visual objects. The at least one processor may be further configured to, when the instructions are executed, suspend, based on the input for the third visual object, execution of the second application based on the input for the third visual object.

According to an example embodiment, the at least one processor may be further configured to, when the instructions are executed, receive a signal configured to cause the electronic device to display a notification for guiding entry into the virtual space from at least one of a plurality of external electronic devices corresponding to the plurality of users based on execution of the second application being suspended. The at least one processor may be further configured to, when the instructions are executed, provide, based on the signal, the notification using a part of the character displayed on a home screen. The at least one processor may be further configured to, when the instructions are executed, enter one of the plurality of virtual spaces using the character by executing the second application in response to identifying at least one touch input for the part of the character.

According to an example embodiment, the at least one processor may be further configured to, when the instructions are executed, control the display to display the home screen using the display based on execution of the second application being suspended. The at least one processor may be further configured to, when the instructions are executed, in response to identifying at least one touch input on the home screen, control the display to display a plurality of images representing a plurality of virtual spaces including the virtual space, which can be entered in a state that the execution of the second application is suspended.

According to an example embodiment, the at least one processor may be further configured to, when the instructions are executed, control the display to display the plurality of images representing a plurality of virtual spaces including the virtual space, which can be entered while the operation mode of the second application is standby mode.

According to an example embodiment, the at least one processor may be further configured to, when the instructions are executed, identify a fifth input for entering another virtual space distinct from the virtual space by the user of the electronic device, while the user is in the virtual space using the character. The at least one processor may be further configured to, when the instructions are executed, control the display to display a list of virtual spaces, including the virtual space and the other virtual space, in which the user entered.

According to an example embodiment, a non-transitory computer readable storage medium storing one or more programs, the one or more programs may include instructions which, when executed by at least one processor of an electronic device including a display], a communication circuit], and a memory], cause the electronic device to while a first application for communication with another user is being executed, to perform operations comprising: identifying a first input representing selecting at least one object corresponding to at least one user among a plurality of objects corresponding to a plurality of users distinct from a user of the electronic device displayed in a first user interface of the first application. The one or more programs may comprise instructions which, when executed by the processor of the electronic device; further cause the electronic device to, based on the first input being identified, identify a second input for executing a second application for communicating the at least one user through a character representing the user in a virtual space. The one or more programs may comprise instructions which, when executed by the processor of the electronic device, cause the electronic device to, based on the first input and the second input, change the first user interface to a second interface of the second application including the virtual space including the character and at least one character representing the at least one user. The one or more programs may comprise instructions which, when executed by the processor of the electronic device, cause the electronic device to, based on the first input and the second input, transmit, to at least one external electronic device of the least one user, a signal configured to cause the at least one external electronic device to display a notification for guiding entry into the virtual space.

According to an example embodiment, the one or more programs may comprise instructions which, when executed by the processor of the electronic device, cause the electronic device to display an element for displaying the plurality of objects while a plurality of contacts are displayed in the first user interface based on execution of the first application. The one or more programs may comprise instructions which, when executed by the processor of the electronic device, cause the electronic device to, in response to a fourth input for the element, display the plurality of objects respectively corresponding to the plurality of users in the first user interface.

According to an example embodiment, the plurality of objects respectively corresponding to the plurality of users may comprise a plurality of thumbnails of a plurality of characters respectively corresponding to the plurality of users, and a plurality of labels for indicating states of the plurality of users in association with the plurality of thumbnails.

According to an example embodiment, the one or more programs may comprise instructions which, when executed by the processor of the electronic device, cause the electronic device to display a thumbnail of the character and a label indicating a state of the user of the electronic device in a first area of the first area and the second area configured in the first user interface. The one or more programs may comprise instructions which, when executed by the processor of the electronic device, cause the electronic device to display the plurality of labels in the second area of the first area and the second area. The label indicating the state of the user of the electronic device may be displayed based on a location of the user identified based on GPS (global positioning system) circuit of the electronic device.

According to an example embodiment, the one or more programs may comprise instructions which, when executed by the processor of the electronic device, cause the electronic device to switch an operation mode of the second application from a standby mode to a connection mode based on identifying that the at least one user enters the virtual space using the at least one character. The one or more programs may comprise instructions which, when executed by the processor of the electronic device, cause the electronic device to activate a camera and a microphone of the electronic device while the operation mode of the second application is the connection mode. The one or more programs may comprise instructions which, when executed by the processor of the electronic device, cause the electronic device to obtain information on the user of the electronic device using the camera and the microphone. The one or more programs may comprise instructions which, when executed by the processor of the electronic device, cause the electronic device to, based on the information on the user, control motion of the character.

According to an example embodiment, an electronic device may comprise a display, a communication circuit, a memory configured to store executable instructions, and at least one processor. The at least one processor may be configured to, when the instructions are executed, control the display to display a message including at least one word related to a virtual space provided using a second application, while a first application for communicating with another user distinct from a user of the electronic device is executed. The at least one processor may be configured to, when the instructions are executed, based on identifying the at least one word included in the message, control the display to display a second user interface, including an object for executing the second application for communicating with the other user through a character representing the user in the virtual space, superimposed on a first user interface of the first application. The at least one processor may be configured to, when the instructions are executed, change, based on an input for the object, the first user interface to a third user interface of the second application, including the virtual space including the character and another character representing the other user.

According to an example embodiment, an electronic device may comprise a display, a communication circuit, a memory configured to store executable instructions, and at least one processor configured to execute, by accessing the memory, the instructions. The at least one processor may be configured to, when the instructions are executed, display, using the display, a first user interface including information on at least one contact. The at least one processor may be configured to, when the instructions are executed, based on identifying a first input for operating in avatar mode while the first user interface is displayed, control the display to display a second user interface including at least one avatar related to the at least one contact. The at least one processor may be configured to, when the instructions are executed, display a virtual space including an avatar relate to a user of the electronic device based on a second input to select a first contact of the at least one contact displayed in the second user interface.

According to an example embodiment, the at least one processor may be further configured to, when the instructions are executed, control the communication circuit to transmit, to an external electronic device, a signal configured to cause the external electronic device to provide a notification for guiding to display the virtual space using an avatar related to another user of the external electronic device.

According to an example embodiment, the at least one processor may be further configured to, when the instructions are executed, control the display to display the virtual space including the avatar related to the user and the avatar related to the other user.

According to an example embodiment, the at least one processor may be further configured to, when the instructions are executed, identify a third input for changing the avatar related to the user while the second user interface is displayed. The at least one processor may be further configured to, when the instructions are executed, change the avatar related to the user based on the third input. The at least one processor may be further configured to, when the instructions are executed, control the display to display the changed avatar related to the user in the virtual space.

According to an example embodiment, the at least one processor may be further configured to, when the instructions are executed, control the display to display at least one object for representing a state of at least one user related to the at least one contact in the user interface.

According to an example embodiment, the state of the at least one user may be identified by at least one external electronic device related to the at least one contact. The at least one processor may be further configured to, when the instructions are executed, receive information on the state of the at least one user from the at least one external electronic device. The at least one processor may be further configured to, when the instructions are executed, display at least one object in the second user interface based on the information on the state of the at least one user.

According to an example embodiment, the electronic device may comprise a GPS (global positioning system) circuit. The at least one processor may be configured to, when the instructions are executed, identify, using the GPS circuit, a location of the user of the electronic device. The at least one processor may be further configured to, when the instructions are executed, control the display to display an object representing a state of the user in the second user interface based on the location of the user of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A non-transitory computer readable storage medium storing one or more programs, the one or more programs including instructions, which, when executed by at least one processor of an electronic device including a display, communication circuitry, and a memory, cause the electronic device to:

display, via the display, a first user interface of a first application, wherein the first user interface includes a first area and a second area, wherein the first area includes a first object for indicating first contact information, and a second object for indicating second contact information for communicating in a virtual space, and wherein the second area includes one or more contacts corresponding to the first contact information;

based on a first input being received with respect to the second object while the first user interface is displayed, change a user interface of the first application from the first user interface to a second user interface, wherein the second user interface includes:

a third area including the first object for indicating the first contact information and the second object for indicating the second contact information for communicating in the virtual space, and a fourth area for displaying one or more contacts corresponding to the second contact information; and based on a second input being received with respect to the second user interface, display a third user interface of a second application for representing the virtual space.

2. The non-transitory computer readable storage medium of claim 1, wherein the second contact information includes:

a profile image of each of one or more characters respectively associated with one or more users, and a label image for each of the one or more characters, in association with the profile image of each of the one or more characters, wherein the one or more users are related to the one or more contacts corresponding to the second contact information.

3. The non-transitory computer readable storage medium of claim 2, wherein the one or more programs include instructions, which, when executed by the at least one processor of the electronic device, cause the electronic device to:

based on the second user interface being displayed, receive the second input for selecting at least one user among the one or more users, and based on the second input, display the third user interface representing the virtual space including a user character of the electronic device and at least one character respectively associated with the at least one user selected according to the second input.

4. The non-transitory computer readable storage medium of claim 3, wherein the one or more programs include instructions, which, when executed by the at least one processor of the electronic device, cause the electronic device to:

control the communication circuitry to transmit, to at least one external electronic device of the at least one user, a signal configured to cause the at least one external electronic device to display a notification for guiding entry into the virtual space.

5. The non-transitory computer readable storage medium of claim 4, wherein the one or more programs include instructions, which, when executed by the at least one processor of the electronic device, cause the electronic device to:

based on the second input, display a plurality of virtual spaces, and based on a third input for selecting the virtual space among the plurality of virtual spaces, display the third user interface of the second application.

6. The non-transitory computer readable storage medium of claim 4, wherein the label image for each of the one or more characters indicates a state of a corresponding user, and wherein the state of a corresponding user is identified based on a location of the corresponding user.

7. An electronic device comprising:

a display;

communication circuitry;

memory comprising one or more non-transitory storage media and storing executable instructions; and at least one processor comprising processing circuitry, wherein the instructions, when executed by the at least one processor, cause the electronic device to:

display, via the display, a first user interface of a first application, wherein the first user interface includes a first area and a second area, wherein the first area includes a first object for indicating first contact information, and a second object for indicating second contact information for communicating in a virtual space, and wherein the second area includes one or more contacts corresponding to the first contact information;

based on a first input being received with respect to the second object while the first user interface is displayed, change a user interface of the first application from the first user interface to a second user interface, wherein the second user interface includes:

a third area including the first object for indicating the first contact information and the second object for indicating the second contact information for communicating in the virtual space, and a fourth area for displaying one or more contacts corresponding to the second contact information; and based on a second input being received with respect to the second user interface, display a third user interface of a second application for representing the virtual space.

8. The electronic device of claim 7, wherein the second contact information includes:

a profile image of each of one or more characters respectively associated with one or more users, and a label image for each of the one or more characters, in association with the profile image of each of the one or more characters, wherein the one or more users are related to the one or more contacts corresponding to the second contact information.

9. The electronic device of claim 8, wherein the instructions, when executed by the at least one processor, cause the electronic device to:

based on the second user interface being displayed, receive the second input for selecting at least one user among the one or more users, and based on the second input, display the third user interface representing the virtual space including a user character of the electronic device and at least one character respectively associated with the at least one user selected according to the second input.

10. The electronic device of claim 9, wherein the instructions, when executed by the at least one processor, cause the electronic device to:

control the communication circuitry to transmit, to at least one external electronic device of the at least one user, a signal configured to cause the at least one external electronic device to display a notification for guiding entry into the virtual space.

11. The electronic device of claim 10, wherein the instructions, when executed by the at least one processor, cause the electronic device to:

based on the second input, display a plurality of virtual spaces, and based on a third input for selecting the virtual space among the plurality of virtual spaces, display the third user interface of the second application.

12. The electronic device of claim 10, wherein the label image for each of the one or more characters indicates a state of a corresponding user, and wherein the state of a corresponding user is identified based on a location of the corresponding user.

13. The electronic device of claim 9, further comprising:

a camera; and a microphone, wherein the instructions, when executed by the at least one processor, cause the electronic device to:

switch an operation mode of the second application from a standby mode to a connection mode based on identifying that the at least one user enters the virtual space using the at least one character, activate the camera and the microphone while the operation mode of the second application is the connection mode, obtain information on a user of the electronic device using the camera and the microphone, and based on the information on the user, control motion of the user character.

14. The electronic device of claim 13, wherein the instructions, when executed by the at least one processor, cause the electronic device to control the display to display a plurality of visual objects for controlling activity of the user character in the virtual space, superimposed on the virtual space based on the at least one user entering the virtual space using the at least one character.

15. The electronic device of claim 14, wherein the instructions, when executed by the at least one processor, cause the electronic device to:

identify an input for a first visual object for displaying a content in the virtual space, among the plurality of visual objects, and based on the input for the first visual object, control the display to display at least one content among a plurality of contents stored in the memory in association with the user character in the virtual space.

16. The electronic device of claim 14, wherein the instructions, when executed by the at least one processor, cause the electronic device to:

identify an input for a second visual object for changing the operation mode of the second application among the plurality of visual objects, switch the operation mode of the second application from the connection mode to the standby mode based on the input for the second visual object, and while the operation mode of the second application is the standby mode, deactivate the camera and the microphone.

17. The electronic device of claim 14, wherein the instructions, when executed by the at least one processor, cause the electronic device to:

identify an input for a third visual object for exiting the virtual space among the plurality of visual objects, and suspend, based on the input for the third visual object, execution of the second application.

18. The electronic device of claim 17, wherein the instructions, when executed by the at least one processor, cause the electronic device to:

based on execution of the second application being suspended, receive a signal configured to cause the electronic device to display a notification for guiding entry into a virtual space from an external electronic device, and provide, based on the signal, the notification using a part of the user character displayed on a home screen, and enter one of a plurality of virtual spaces using the user character by executing the second application in response to identifying at least one touch input for the part of the user character.

19. The electronic device of claim 17, wherein the instructions, when executed by the at least one processor, cause the electronic device to:

display a home screen using the display based on execution of the second application being suspended, and in response to identifying at least one touch input on the home screen, control the display to display a plurality of images representing a plurality of virtual spaces including the virtual space, which can be entered in a state that the execution of the second application is suspended.

20. The electronic device of claim 7, wherein the instructions, when executed by the at least one processor, cause the electronic device to:

identify an input for entering another virtual space distinct from the virtual space by a user of the electronic device, while the user is in the virtual space using a user character, and control the display to display a list of virtual spaces, including the virtual space and the other virtual space.

* * * * *